(12) United States Patent
Nishijima

(10) Patent No.: US 7,974,492 B2
(45) Date of Patent: Jul. 5, 2011

(54) IMAGE DATA REPRODUCING APPARATUS WITH CHANGING PROPORTIONS OF COMBINED ENLARGED IMAGES, METHOD OF CONTROLLING SAME AND CONTROL PROGRAM THEREFOR

(75) Inventor: Masakazu Nishijima, Asaka (JP)

(73) Assignee: Fujifilm Corporation, Tokyo (JP)

( * ) Notice: Subject to any disclaimer, the term of this patent is extended or adjusted under 35 U.S.C. 154(b) by 957 days.

(21) Appl. No.: 11/902,281

(22) Filed: Sep. 20, 2007

(65) Prior Publication Data

US 2008/0075388 A1 Mar. 27, 2008

(30) Foreign Application Priority Data

Sep. 25, 2006 (JP) .................................. 2006-258163

(51) Int. Cl.
*G06K 9/36* (2006.01)
(52) U.S. Cl. ........ 382/276; 382/118; 345/473; 345/629; 345/660
(58) Field of Classification Search .................. None
See application file for complete search history.

(56) References Cited

U.S. PATENT DOCUMENTS

| | | | |
|---|---|---|---|
| 6,930,687 B2 * | 8/2005 | Grosvenor et al. | 345/473 |
| 7,574,016 B2 * | 8/2009 | Steinberg et al. | 382/103 |
| 2003/0025810 A1 * | 2/2003 | Pilu et al. | 348/239 |
| 2004/0054542 A1 * | 3/2004 | Foote et al. | 704/500 |
| 2006/0132507 A1 * | 6/2006 | Wang | 345/660 |

FOREIGN PATENT DOCUMENTS

| | | |
|---|---|---|
| JP | 2005-33276 | 2/2005 |
| JP | 2005-354333 | 12/2005 |
| JP | 2006-129453 | 5/2006 |
| JP | 2006-262496 | 9/2006 |
| JP | 2008-61114 | 3/2008 |

* cited by examiner

*Primary Examiner* — Sath V Perungavoor
*Assistant Examiner* — Jason Heidemann
(74) *Attorney, Agent, or Firm* — McGinn IP Law Group, PLLC

(57) ABSTRACT

When a transition is made from display of one image of a subject to display of another image of a subject in a slideshow, the transition is made in a natural manner. A first enlarged image is obtained by cropping and enlarging a portion of a subject image so as to include a face-image portion. A plurality of first enlarged images are obtained in such a manner that a cropping zone gradually decreases and the enlarging rate of the cropped image gradually increases. A first enlarged image in which the face-image portion is displayed in close-up is obtained. When a plurality of enlarged images are displayed one after another and a first enlarged image prevailing at the time of image transition is displayed, a second enlarged image in which a face image contained in a second subject image is shown in close-up is displayed. Second enlarged images that gradually zoom out from the face-image portion are displayed one after another to thereby make a transition to display of the second subject image.

16 Claims, 22 Drawing Sheets

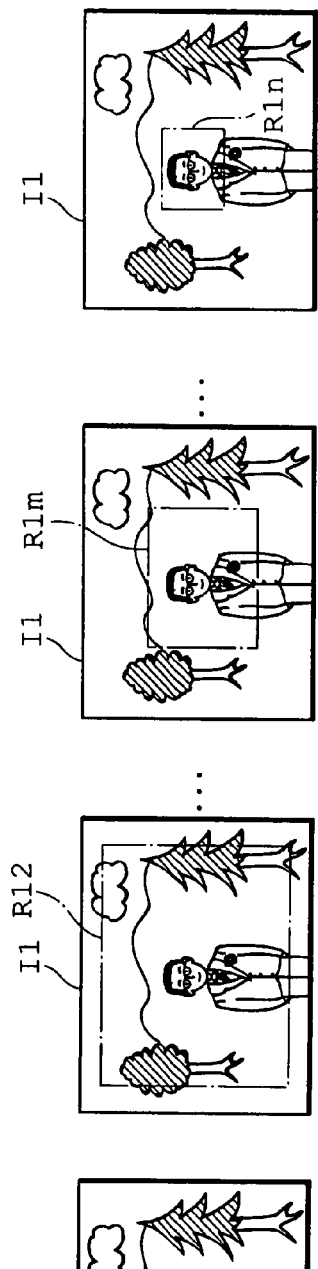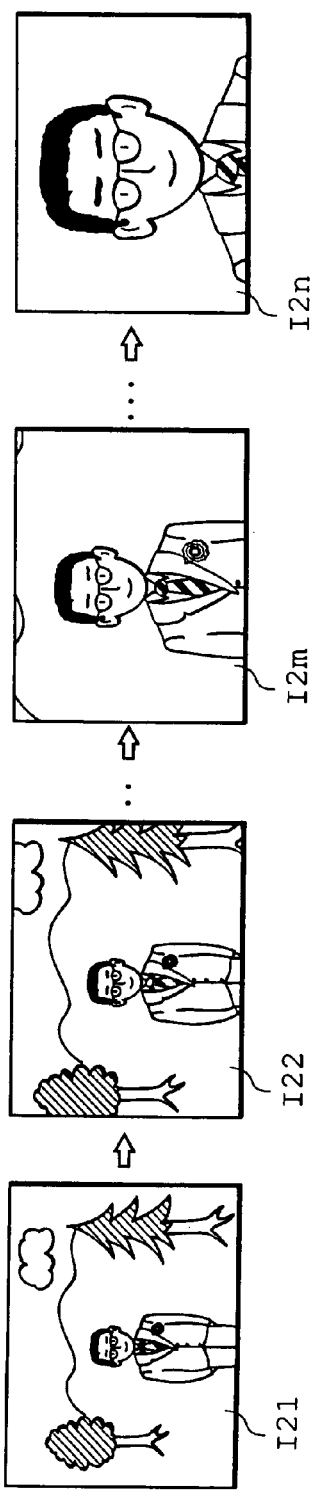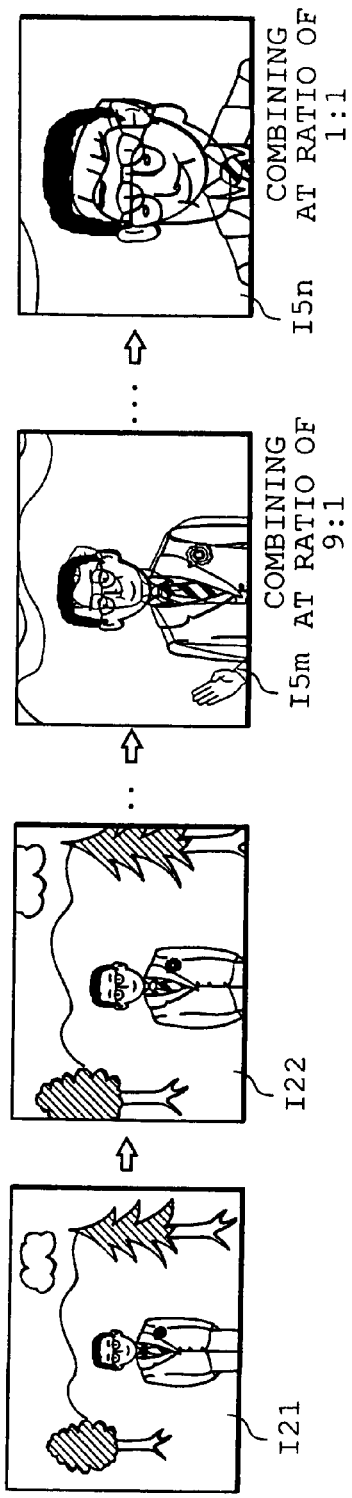
Fig. 11A CROPPING ZONES OF FIRST SUBJECT IMAGE
Fig. 11B FIRST ENLARGED IMAGES
Fig. 11C IMAGES DISPLAYED

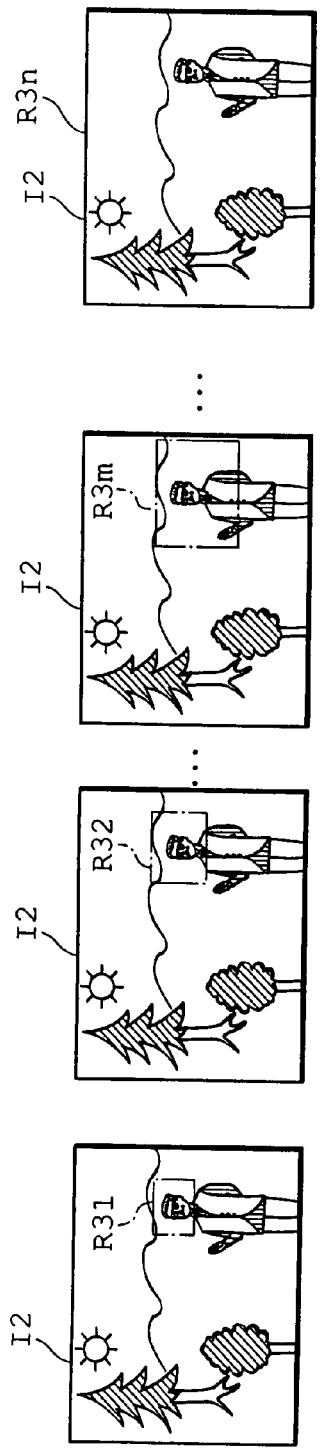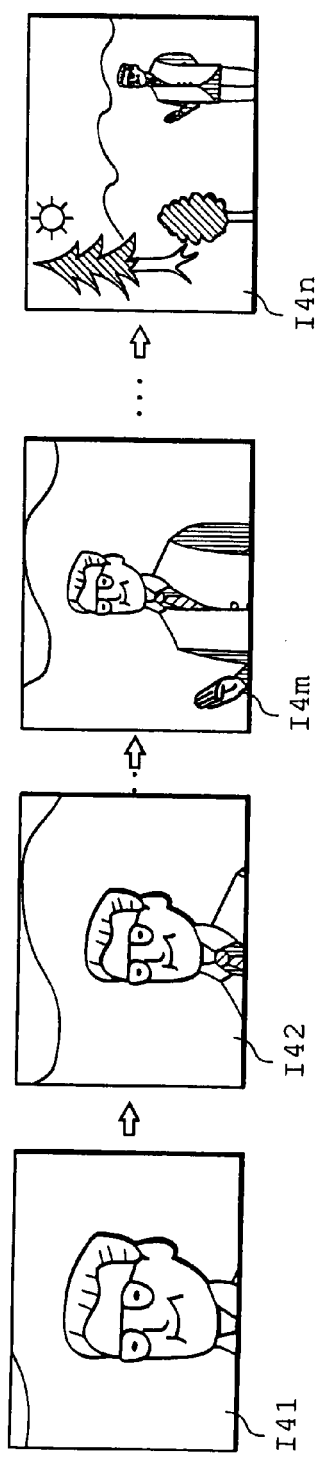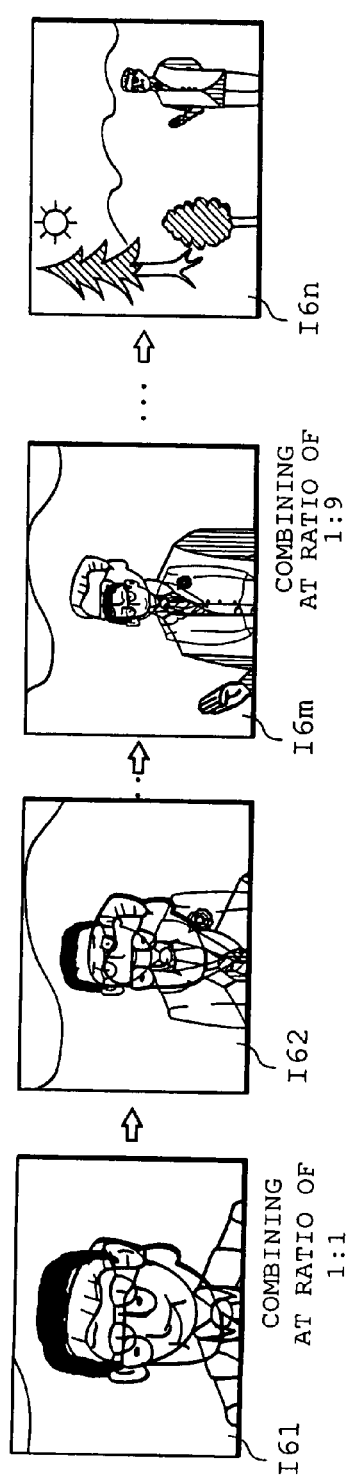
Fig. 12A CROPPING ZONES OF SECOND SUBJECT IMAGE
Fig. 12B SECOND ENLARGED IMAGES
Fig. 12C IMAGES DISPLAYED

IMAGE DATA REPRODUCING APPARATUS WITH CHANGING PROPORTIONS OF COMBINED ENLARGED IMAGES, METHOD OF CONTROLLING SAME AND CONTROL PROGRAM THEREFOR

BACKGROUND OF THE INVENTION

1. Field of the Invention

This invention relates to an image reproducing apparatus, a method of controlling this apparatus and a control program therefor.

2. Description of the Related Art

A slideshow is an effective way to reproduce a plurality of frames of images. In a case where a plurality of frames of images are reproduced while being changed over by a slideshow, the transition from one frame to the next can be performed by so-called fade-in/fade-out, in which the brightness of an image is gradually intensified, the image of the next frame displayed and brightness restored to normal, and so-called wipe, in which an image is gradually moved in a certain direction and gradually caused to vanish. Further, there is also a technique whereby zoom-up is applied to an entire image toward an area of interest within the image, after which the next image is reproduced (see the specification of Japanese Patent Application Laid-Open No. 2005-354333), as well as a technique for applying zoom-in or zoom-out to a main subject in an image (see the specification of Japanese Patent Application Laid-Open No. 2006-129453).

Further, there is a technique whereby what is to be displayed in a slideshow is selected automatically based upon the result of calculating the degree of resemblance of between faces (see the specification of Japanese Patent Application Laid-Open No. 2005-33276).

In any case, however, when a display is changed over from an image presently being displayed to the next image, often the point viewed in the image that is the object of attention of the viewer changes. As a consequence, the attention of the viewer is diminished.

SUMMARY OF THE INVENTION

Accordingly, an object of the present invention is to so arrange it that even if an image has changed over, the viewpoint in the image that is the object of attention of the viewer will not change.

According to the present invention, the foregoing object is attained by providing an image reproducing apparatus comprising: a first cropping device (means) for cropping an image from a first subject image in such a manner that a face-image portion contained in the first subject image will be included in the portion of the image that has been cropped; a first enlarging device (means) for enlarging the image, which has been cropped by the first cropping device, so as to take on the size of the first subject image; a first display control device (means) for controlling a display unit in such a-manner that the cropped image enlarged by the first enlarging device is displayed on a display screen; a first control device (means) for controlling the first cropping device, the first enlarging device and the first display control device so as to repeat the image cropping processing, the enlargement processing and the display control processing in such a manner that the cropped image will become smaller than the preceding cropped image, until the cropped-image takes on a prescribed size; a second cropping device (means) for cropping an image from a second subject image in such a manner that a face-image portion contained in the second subject image will be included in the portion of the image that has been cropped, this cropping being performed in response to the image cropped by the first cropping device taking on the prescribed size; a second enlarging device (means) for enlarging the image, which has been cropped by the second cropping device, so as to take on the size of the second subject image; a second display control device (means) for controlling the display unit in such a manner that the cropped image enlarged by the second enlarging device is displayed on the display screen; and a second control device (means) for controlling the second cropping device, the second enlarging device and the second display control device so as to repeat the image cropping processing, the enlargement processing and the display control processing in such a manner that the cropped image will become larger than the preceding cropped image.

The present invention also provides a control method suited to the above-described image reproducing apparatus. Specifically, the present invention provides a method of controlling an image reproducing device, comprising the steps of: cropping a first image from a first subject image in such a manner that a face-image portion contained in the first subject image will be included in the portion of the first image that has been cropped; enlarging the cropped first image so as to take on the size of the first subject image; displaying the enlarged cropped first image on a display screen; repeating the image cropping processing, the enlargement processing and the display control processing in such a manner that the cropped first image will become smaller than the preceding cropped first image, until the cropped first image takes on a prescribed size; cropping a second image from a second subject image in such a manner that a face-image portion contained in the second subject image will be included in the portion of the second image that has been cropped, this being performed in response to the first image after cropping taking on the prescribed size; enlarging the cropped second image so as to take on the size of the second subject image; displaying the enlarged cropped second image on the display screen; and repeating the image cropping processing, the enlargement processing and the display control processing in such a manner that the cropped second image will become larger than the preceding cropped second image.

In accordance with the present invention, an image is cropped from a first subject image in such a manner that a face-image portion contained in the first subject image will be included in the image portion that remains after cropping. Enlargement processing is executed in such a manner that the size of the cropped image will take on the size of the first subject image. The enlarged image is displayed. Cropping and enlargement of the image and display control are repeated, in such a manner that the image after cropping will become smaller than the preceding image after cropping, until the image after cropping takes on a prescribed size. When the cropped image attains the prescribed size, an image is cropped from a second subject image in such a manner that a face-image portion contained in the second subject image will be included in the image portion that remains after cropping. The cropped image is enlarged and displayed so as to take on the size of the second subject image. Cropping and enlargement of the image and display control are repeated in such a manner that the size of the image after cropping will become larger than the size of the preceding image after cropping. The first subject image is displayed in such a manner that the proportion of the face-image portion contained in the first subject image gradually increases. The second subject image is displayed in such a manner that the proportion of the face-image portion contained in the second subject image gradually decreases. When the display changes over from the first subject image to the second subject image, the image displayed is one in which the proportion of the face-image portion is large. As a result, the viewed point to which the attention of viewer is directed does not change and the attention of the viewer will not be diminished.

The first display control device and the second display control device control the display unit in such a manner that a first enlarged image enlarged by the first enlarging device and a second enlarged image enlarged by the second enlarging device are combined and displayed on the display screen. Since the first and second enlarged images are combined and displayed, the transition from the display of the first enlarged imaged (first subject image) to the display of the second enlarged image (second subject image) takes place without appearing unnatural.

For example, the first display control device combines and displays the first and second enlarged images in such a manner that as the size of the cropped image cropped by the first cropping device decreases, the proportion of the first enlarged image combined decreases and the proportion of the second enlarged image combined increases. The second display control device combines and displays the first and second enlarged images in such a manner that as the size of the cropped image cropped by the second cropping device increases, the proportion of the first enlarged image combined decreases and the proportion of the second enlarged image combined increases. Before the transition is made from the first enlarged image (first subject image) to the second enlarged image (second subject image), the second enlarged image gradually appears on the first enlarged image. After the transition is made to the second enlarged image, the proportion of the first enlarged image appearing on the second enlarged image gradually diminishes. As a result, the transition from the first enlarged image to the second enlarged image takes place in a natural manner.

By way of example, the second cropping device executes cropping processing so as to achieve coincidence between relative positions of eyes in the cropped image cropped by the first cropping device and relative positions of eyes in a first cropped image cropped by the second cropping device, and decides a cropped image in such a manner that the positional relationship between the image after cropping and the second subject image will gradually match. Since the positions of eyes in the first enlarged image and the positions of eyes in the second enlarged image coincide, an unnatural appearance caused by a shift in the positions of the eyes can be prevented when a transition is made from the first enlarged image to the second enlarged image.

The apparatus may further comprise a halt control device (means) for halting processing by the image reproducing apparatus if the first subject image or second subject image does not contain a face-image portion.

In a case where at least one of the first subject image and second subject image contains a plurality of face images, the first cropping device and the second cropping device execute processing for cropping an image from the first subject image and processing for cropping an image from the second subject image in such a manner that the images will contain face-image portions for which the degree of resemblance of the cropped face images will be high, by way of example. Since the face images being displayed when the transition is made from the first enlarged image to the second enlarged image resemble each other, an unnatural appearance caused by transition of the display can be prevented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11A illustrates cropping zones of a first subject image, FIG. 11B illustrates first enlarged images, and FIG. 11C illustrates displayed images according to the second embodiment;

FIG. 12A illustrates cropping zones of a second subject image, FIG. 12B illustrates second enlarged images, and FIG. 12C illustrates displayed images according to the second embodiment;

DESCRIPTION OF THE PREFERRED EMBODIMENTS

Preferred embodiments of the present invention will now be described in detail with reference to the accompanying drawings.

Figure 1:
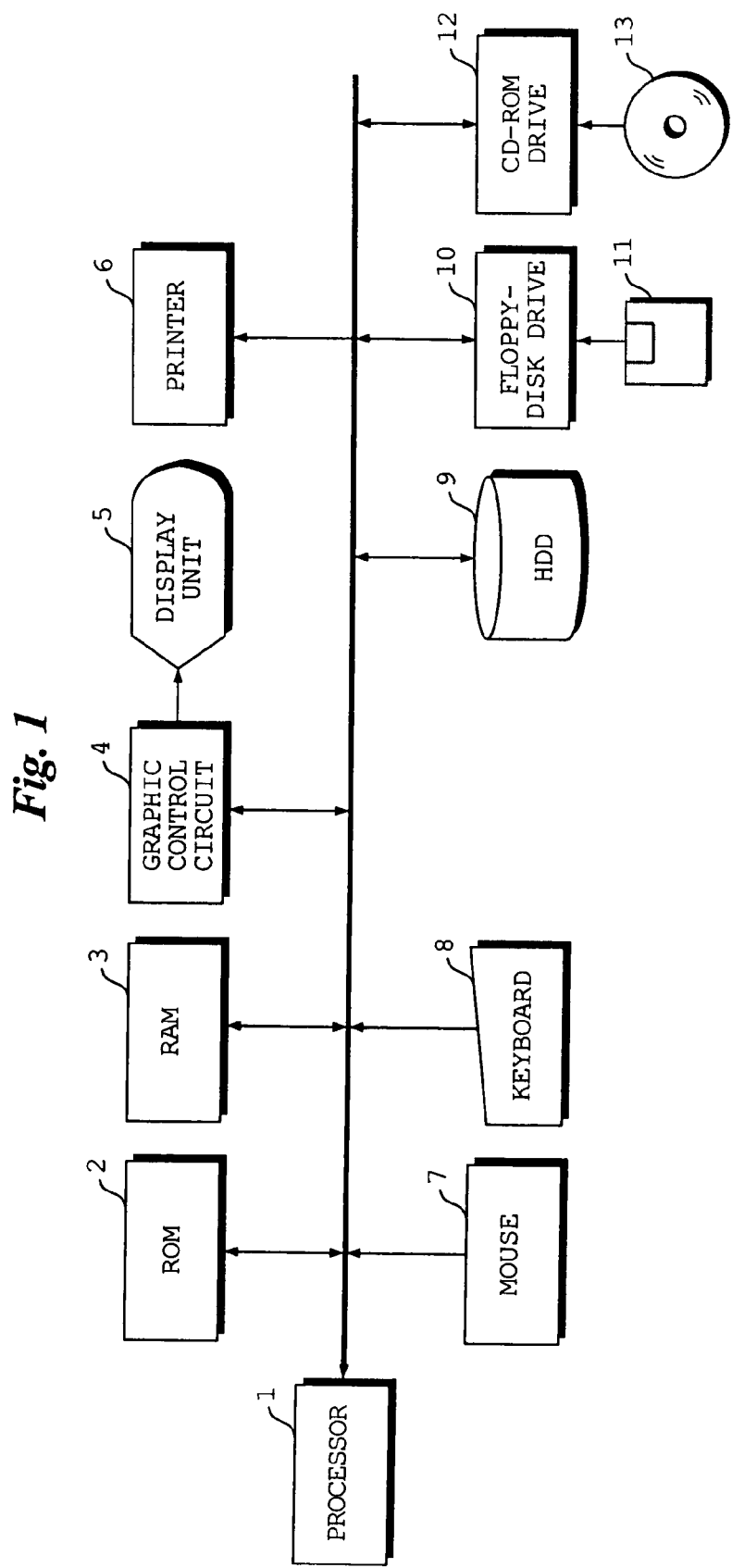
FIG. 1 is a block diagram illustrating the electrical configuration of an image reproducing apparatus according to the present invention.

FIG. 1 is a block diagram illustrating the electrical configuration of an image reproducing apparatus according to a preferred embodiment of the present invention.

The overall operation of the image reproducing apparatus is controlled by a processor 1. As will be described later, images represented by image data that has been stored on a hark disk (not shown) are subjected to cropping and enlargement processing and to detection of face images by the processor 1.

The image reproducing apparatus includes a ROM 2 in which programs and data, etc., have been stored in advance; a RAM 3 for storing data temporarily; a graphic control circuit 4 for controlling a display unit 5 that displays a reproduced image; a printer 6 for printing images and the like; a mouse 7; a keyboard 8; a hard-disk drive 9 for accessing a hard disk (not shown) on which a large number of items of image data representing images to be reproduced have been stored; and a floppy-disk drive 10 for writing data to a floppy disk 11 and reading data that has been written to the floppy disk 11.

The image reproducing apparatus further includes a CD-ROM (compact disk-read-only memory) drive 12. By loading a CD-ROM 13 storing an operating program, described later, in the CD-ROM drive 12, the operating program stored on the CD-ROM 13 is read and installed in the image reproducing apparatus.

Figure 2:
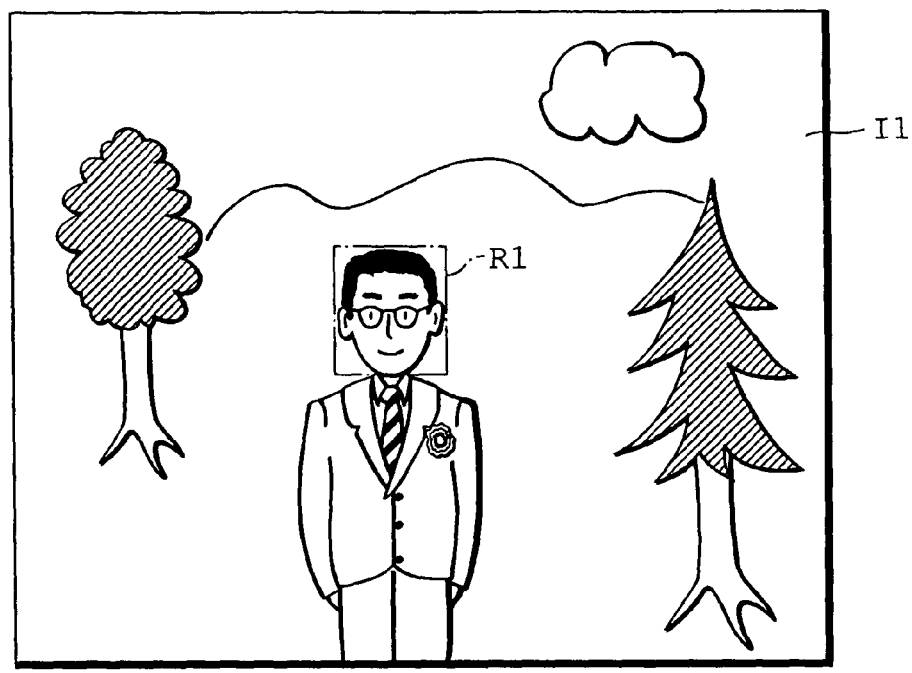
FIG. 2 illustrates an example of the image of a subject according to a first embodiment.
Figure 3:
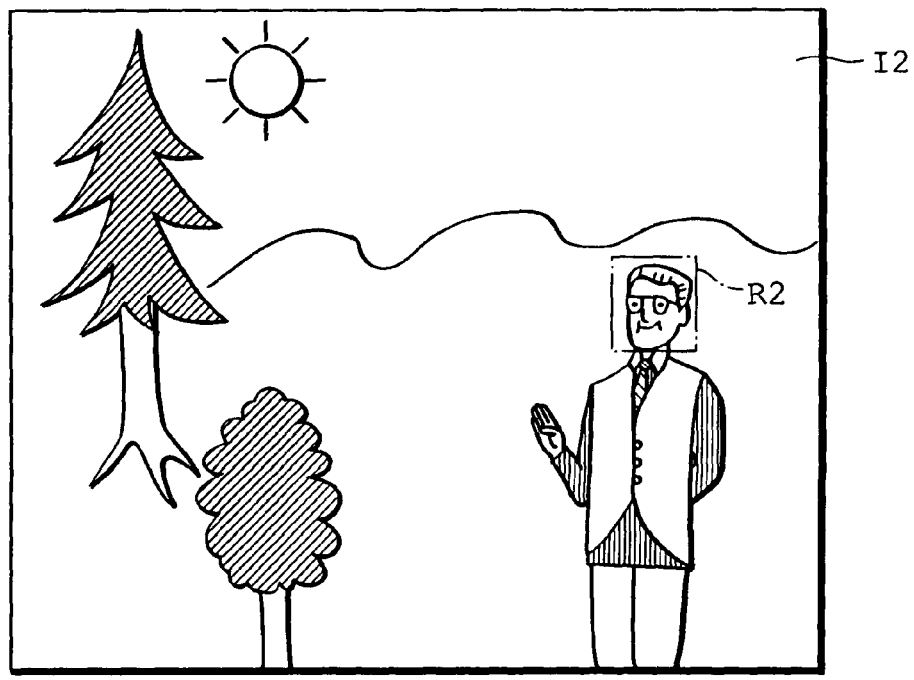
FIG. 3 illustrates an example of the image of a subject according to the first embodiment.

FIGS. 2 and 3 illustrate examples of images displayed in the image reproducing apparatus.

Image reproduction in the image reproducing apparatus of this embodiment is capable of displaying a plurality of frames of images by a slideshow. In particular, this embodiment is such that when a display transitions to the image of a succeeding frame, the proportion of a face-image portion in the image before the transition increases. When this proportion attains a prescribed proportion, the transition is made to the next image. The next image is displayed in such a manner that the proportion of the face-image portion gradually decreases. In order to achieve this, a face-frame area R1, which indicates a portion of a first subject image I1 prevailing before the display changes over, and a face-frame area R2, which indicates a portion of a second subject image I2 after the display has changed over, are detected. Processing for changing over the display of the image is executed using these face-frame areas R1 and R2, as will be described later.

Figure 4:
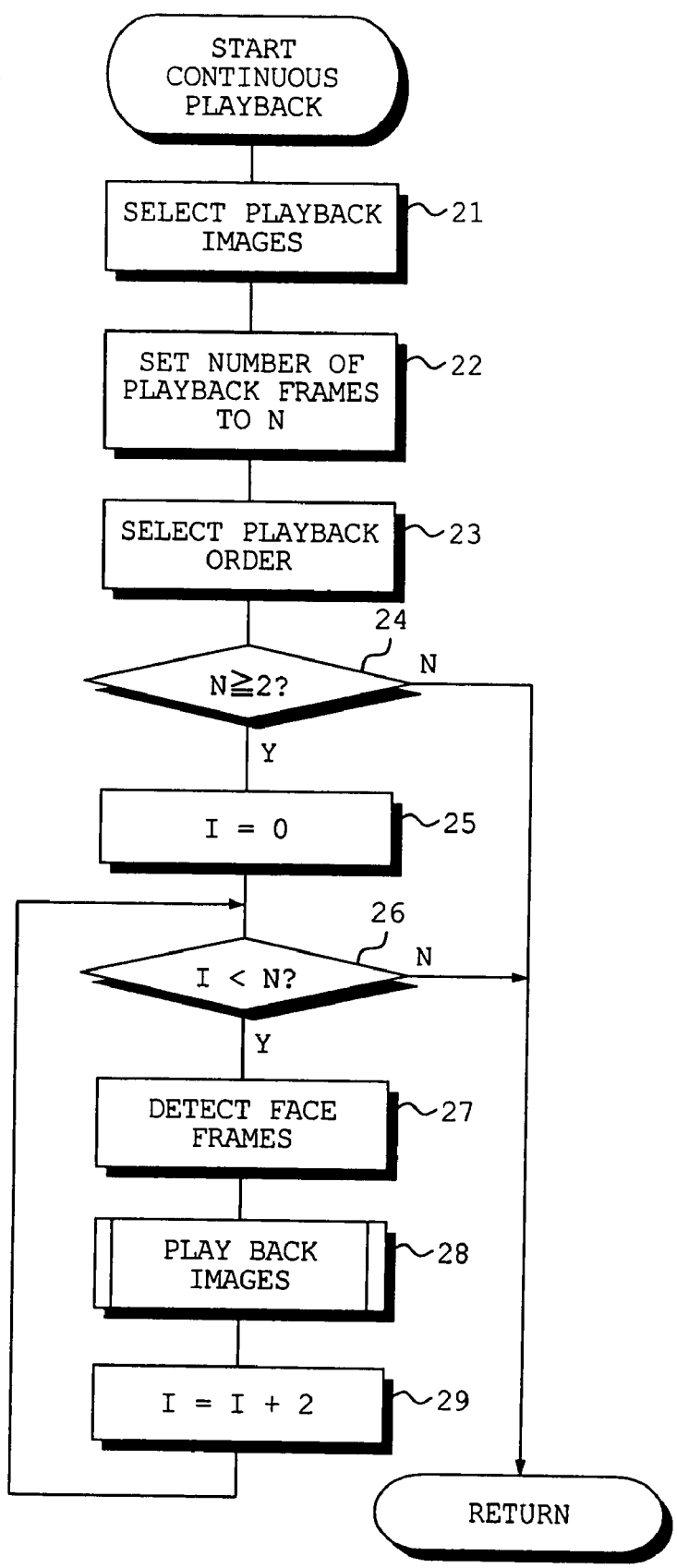
FIG. 4 is a flowchart illustrating processing executed by the image reproducing apparatus according to the first embodiment.

FIG. 4 is a flowchart illustrating processing executed by the image reproducing apparatus.

Images to be reproduced are selected by the user from among a number of frames of images represented by image data that has been stored on the hard disk (step 21). A number N of such playback frames is set (step 22) and the order of playback is selected (step 23). If the number N is not 2 or greater ("NO" at step 24), images cannot be changed over displayed and, hence, the image reproduction processing according to this embodiment is terminated. The order in which this image is reproduced is selected by selecting the order of the file name, the order of shooting date, etc.

In this embodiment, face-frame detection processing and image playback, etc., are executed using every two frames as the reference. If the number N of playback frames is 2 or greater ("YES" at step 24), therefore, a variable I for processing using two frames as the reference is set to 0 (step 25). If the variable I is less than the number N of playback frames, this means that an image for which face-frame detection processing, etc., has not ended remains among the selected playback images. Face-frame detection processing, therefore, is executed (step 27) and is followed by image reproduction processing (step 28). Next, 2 is added to the variable I (step 29). The processing for detecting face frames and for reproducing images is repeated until the variable I becomes equal to or greater than the number of playback frames. If the variable I becomes equal to or greater than the number N of playback frames ("NO" at step 26), reproduction of the selected playback images ends and, hence, reproduction processing is exited. Of course, it may be so arranged that selected images are played back again in accordance with a selected playback order.

Processing for detecting a face frame can make use of well-known processing for detecting a face image. For example, face data of a plurality of frames is registered in advance and a face is detected by applying pattern matching to these items of face data. Alternatively, object data constituting faces, such as eyes, noses and mouths, and the positions of these objects are registered in advance and a face is detected by applying pattern matching. A frame enclosing the detected face-image portion (e.g., although the frame is rectangular, the frame may be made one having an aspect ratio identical with that of the image) is adopted as the face frame. If a plurality of face-image portions are detected, then the frame enclosing the largest face-image portion is detected as the face frame, by way of example.

Figure 5:
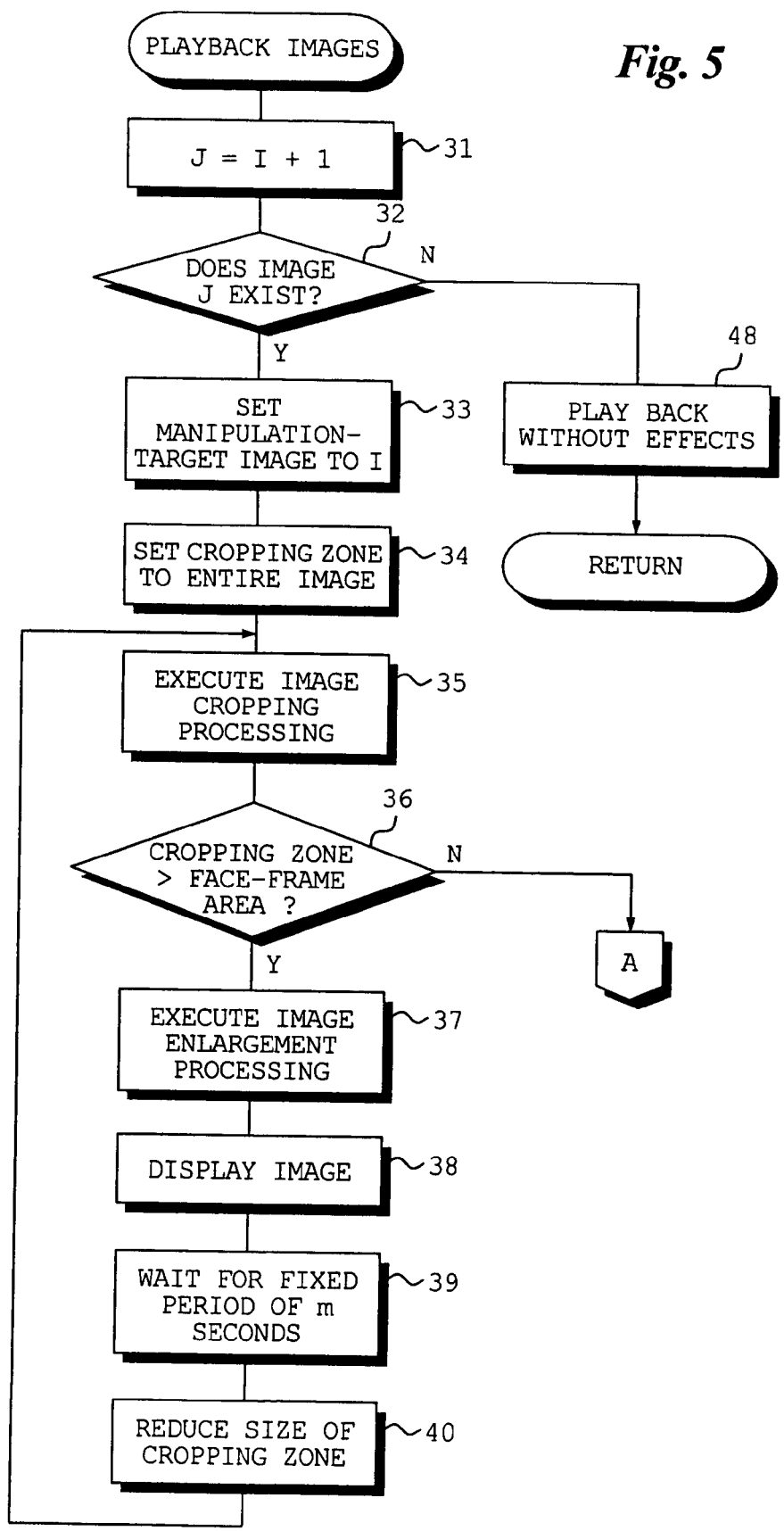
FIG. 5 is a flowchart illustrating image reproduction processing according to the first embodiment.
Figure 6:
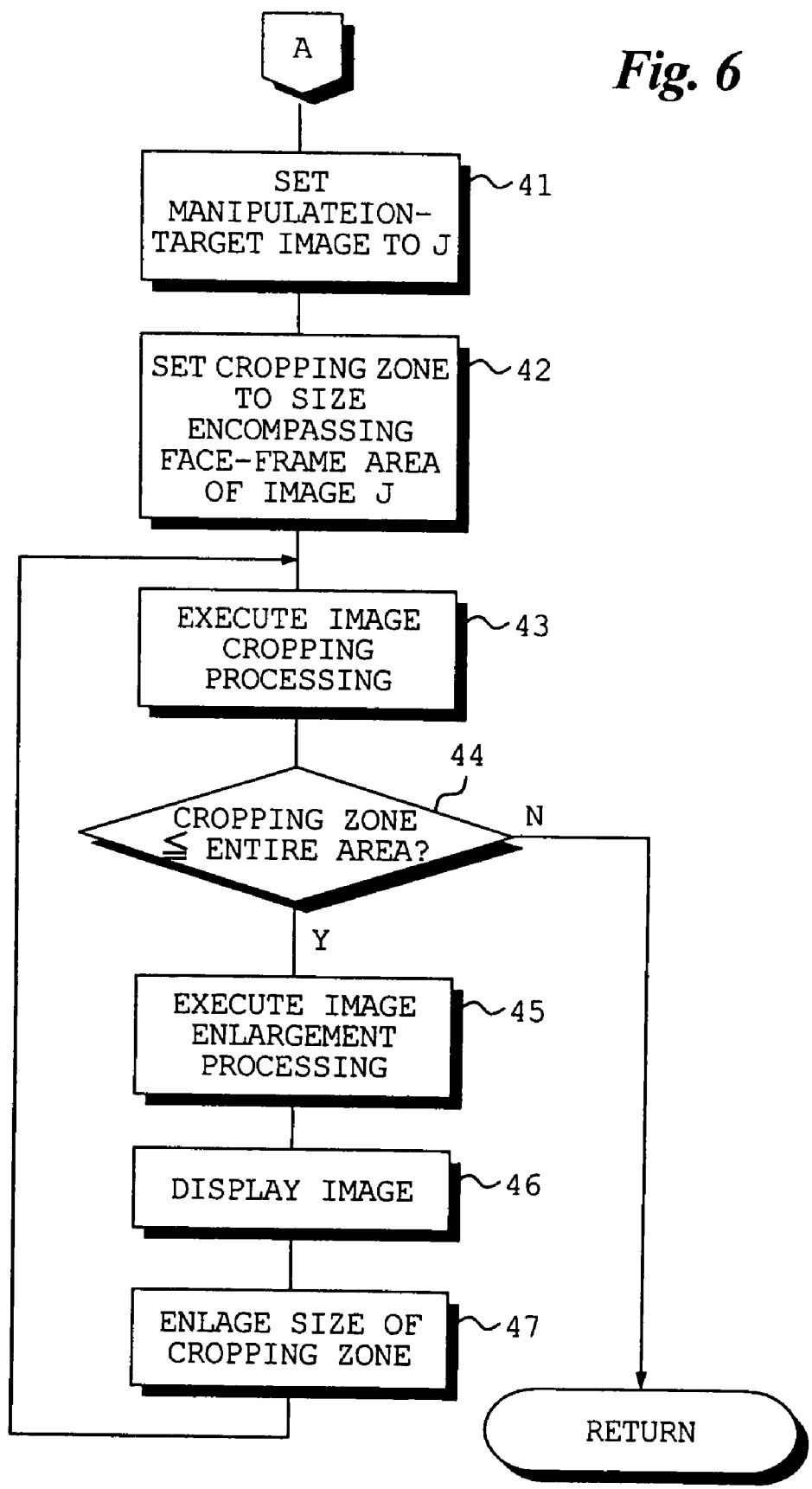
FIG. 6 is a flowchart illustrating image reproduction processing according to the first embodiment.

FIGS. 5 and 6 are flowcharts illustrating image reproduction processing (the processing at step 28 in FIG. 4). FIG. 7A illustrates cropping zones of a first subject image, and FIG. 7B illustrates first enlarged images displayed. FIG. 8A illustrates cropping zones of a second subject image, and FIG. 8B illustrates second enlarged images displayed.

Image reproduction according to this embodiment is executed as follows: In a case where the display is changed over from a first subject image to a second subject image, an image is cropped from the first subject image in such a manner that a face-image portion contained in the first subject image will be included (this is image cropping processing), and the cropped image is displayed upon being enlarged so as to take on the size of the first subject image (this is enlargement and display processing). The image cropping processing is executed again in such a manner that the cropping zone becomes smaller than the preceding cropping zone, and then the enlargement and display processing is executed. The image cropping processing and the enlargement and display processing is repeated. When the image after cropping takes on a prescribed size (the size of the face frame), processing for cropping an image from the second subject image is executed in such a manner that a face-image portion contained in the second subject image will be included, and the cropped image is displayed upon being enlarged in such a manner that the size of the cropped image will take on the size of the second subject image. The image cropping processing is executed again in such a manner that the cropping zone becomes larger than the preceding cropping zone, and then the enlargement and display processing is executed. The image cropping processing and the enlargement and display processing of the second subject image also is repeated.

The image specified by the variable I is the first subject image, and the image specified by a variable J is the second subject image. Accordingly, the variable J is set to a value obtained by incrementing the variable I (step 31). If an image of variable J does not exist ("NO" at step 32), then the image of variable I becomes the image of the final frame selected. This image is therefore reproduced with effects (step 48).

If an image of variable J exists ("YES" at step 32), then a manipulation-target image to undergo image cropping and enlargement processing in the manner described above is set to be the image of variable I (the first subject image) (step 33). Initially, in order to so arrange it that the first subject image itself is displayed, a cropping zone R11 is set to the entire first subject image I1 (step 34), as illustrated in FIG. 7A. The image within the set cropping zone R11 is cropped from the first subject image I1 (step 35). If the cropped image area (the cropping zone) is equal to or smaller than the face-frame area R1 (see FIG. 2), a transition is made from display of a first enlarged image obtained by cropping the first subject image to display of a second enlarged image obtained by cropping the second subject image.

If the cropping zone is larger than the face-frame area ("YES" at step 36), then the cropped image is enlarged so as to take on the size of the first subject image I1 (step 37). As illustrated in FIG. 7B, the enlarged image (first enlarged image), indicated at I21, is displayed (step 38). Since the cropping zone has initially been set to the entirety of the first subject image, the first enlarged image I21 and the first subject image I1 are identical and what is displayed is the unenlarged first subject image I1 itself. The display of the first enlarged image I21 continues for a fixed period of time of m seconds (step 39). The cropping zone is then reduced (step 40) and the image within this cropping zone is cropped (step 35). The size of the cropped image is displayed upon being enlarged so as to take on the size of the first subject image (steps 37, 38).

As illustrated in FIG. 7A, a cropping zone R12, which is smaller than the cropping zone R11, is set anew and the image within the cropping zone R12 is enlarged so as to take on the size of the first subject image I1. As a result, a first enlarged image I22 is obtained, as shown in FIG. 7B. The first enlarged image I22 obtained is displayed. Similarly, as illustrated in FIG. 7A, a cropping zone R13 smaller than the cropping zone R12 is set, the image within the zone R13 is enlarged so as to take on the size of the first subject image I1, and a first enlarged image I23 is obtained and displayed, as shown in FIG. 7B. Thereafter, and in similar fashion, while the cropping zone is reduced until it becomes smaller than the face-frame area R1 (see FIG. 2), the image within the cropping zone is cropped and the cropped image is displayed upon being enlarged so as to take on the size of the first subject image I1. The cropping zone becomes gradually smaller. Eventually, a first enlarged image I2$n$, which is obtained by enlarging the image within a zone R1$n$ larger than the face-frame area R1 (see FIG. 2), as illustrated in FIG. 7A, is displayed (see FIG. 7B). As illustrated in FIG. 7B, first enlarged images I21 to I2$n$ obtained and displayed based upon the first subject image I1 are such that the face-image portion contained in the first subject image I1 becomes gradually larger.

When the cropping zone becomes equal to or smaller than the face-frame area R1 ("NO" at step 36), a transition is made from display of the first enlarged image based upon the first subject image I1 to display of a second enlarged image obtained based upon the second subject image I2. To accomplish this, the manipulation-target image is set to the second subject image I2 of variable J (step 41). Next, a cropping zone R31 is set (step 42). The cropping zone R31 encompasses the face frame R2 (see FIG. 3) of the second subject image I2 and, as illustrated in FIG. 8A, is larger than the face frame R2. The image within the set cropping zone R31 is cropped (step 43).

If the cropping zone is equal to or smaller than the entirety of the second subject image I2 ("YES" at step 44), enlargement processing is executed since the second enlarged image obtained by enlarging the image within the cropping zone is one part of the second subject image I2, and a second enlarged image, which is indicated at I41, is obtained (step 45) in the manner shown in FIG. 8B. The second enlarged image I41 obtained is displayed (step 46). It goes without saying that the display continues for the fixed period of time of m seconds, as described above. The cropping zone is enlarged (step 47) and the cropping processing (step 43) and image enlargement processing (step 45) is repeated. As illustrated in FIG. 8A, the cropping zone is gradually enlarged, as indicated by cropping zones R32, R33, enlargement processing is executed in such a manner that the images within the cropping zones R32, R33 take on the size of the second subject image, and second enlarged images I42, I43 are obtained and displayed. When a cropping zone R3$n$ becomes the same as the entire area of the second subject image I2, as shown in FIG. 8A, a second enlarged image I4$n$ becomes identical with the second subject image I2, as illustrated in FIG. 8B.

When the cropping zone becomes larger than the entirety of the second subject image I2 ("No" at step 44), the display processing regarding the second subject image I2 ends and a transition is made to processing for displaying the subject image of the next frame. As illustrated in FIG. 8B, second enlarged images I41 to I4$n$ obtained and displayed based upon the second subject image I2 are such that the face-image portion contained in the second subject image I2 becomes gradually smaller.

The transition from the first subject image I1 to the second subject image I2 is performed just as if the display were zooming in on the face image contained in the first subject image I1 and were zooming out from the face image contained in the second subject image I2. Moreover, the image presented when the display changes over from the first enlarged image obtained based upon the first subject image I1 to the second enlarged image obtained based upon the second subject image I2 is such that the proportion occupied by the image (the face-image portion) within the face frame is large. Since the close-up face-image portion is changed over to the next subject image in a state in which it is being scrutinized by the viewer, the attention of the viewer will not diminish.

FIGS. 9 to 14 illustrate another embodiment of the present invention.

In the embodiment described above, a transition is made from display of a first enlarged image in which the proportion of the face-image portion contained gradually increases to display of a second enlarged image in which the proportion of the face-image portion contained gradually decreases. In the embodiment described next, however, first and second enlarged images are combined and displayed. Combining is performed in such a manner that as the size of an image cropped from the first subject image I1 decreases, the proportion of the first enlarged image combined decreases and the proportion of the second enlarged image combined increases. Combining is performed in such a manner that as the size of an image cropped from the second subject image I2 increases, the proportion of the first enlarged image combined decreases and the proportion of the second enlarged image combined increases.

Figure 9:
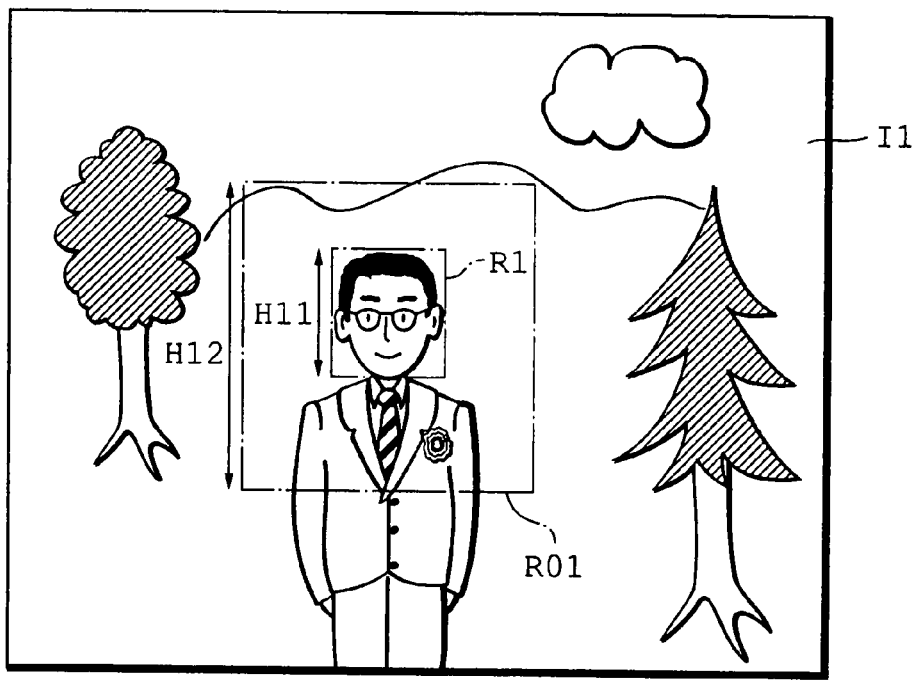
FIG. 9 illustrates an example of the image of a subject according to a second embodiment.
Figure 10:
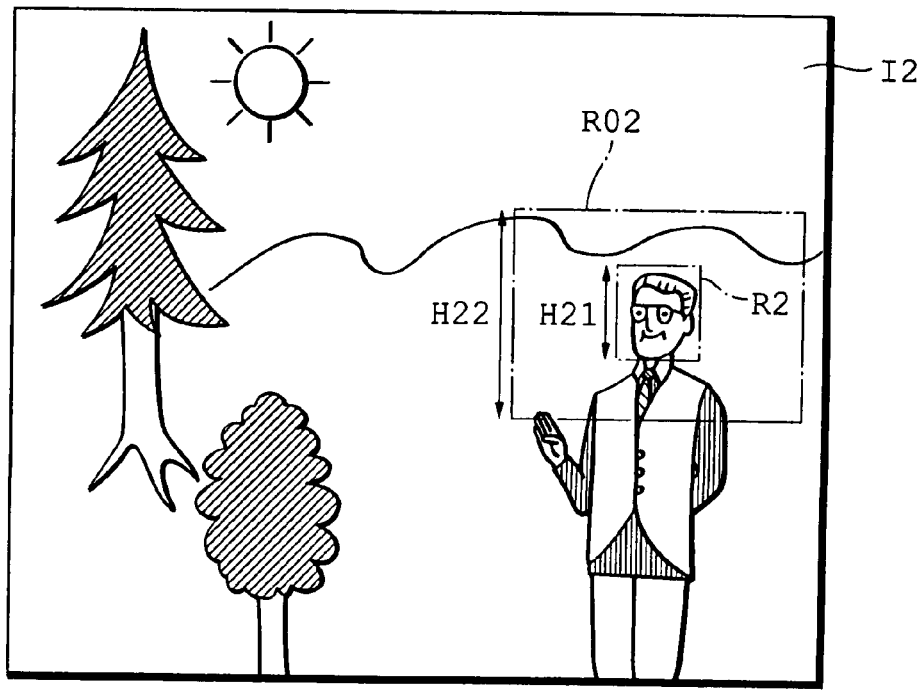
FIG. 10 illustrates an example of the image of a subject according to the second embodiment.

FIG. 9 illustrates an example of the first subject image I1, and FIG. 10 illustrates an example of the second subject image I2.

The combining of the first and second enlarged images begins in response to the cropping zone of the first subject image I1 becoming equal to or smaller than a combining timing area, and the combining of the first and second enlarged images ends in response to the cropping zone of the second subject image I2 becoming larger than a combining timing area. To accomplish this, a combining timing area is set for each of the first subject image I1 and second subject image I2. The combining timing area is made a rectangular area that is 1.5 times the area (1.5 times the height) of the rectangular face frame.

As shown in FIG. 9, if we let H11 represent the height of the face-frame area R1 contained in the first subject image I1, then a combining timing area R01 is defined so as to enclose the face-frame area R1 at the center thereof. If the height of the combining timing area R01 is H12, then we have H12/H11=1.5.

Similarly, as shown in FIG. 10, if we let H21 represent the height of the face-frame area R2 contained in the second subject image I2, then a combining timing area R02 is defined so as to enclose the face-frame area R2 at the center thereof. If the height of the combining timing area R02 is H22, then we have H22/H21=1.5.

FIG. 11A illustrates the cropping zones of the first subject image I1, FIG. 11B illustrates first enlarged images, and FIG. 11C illustrates displayed images. FIG. 12A illustrates the cropping zones of the second subject image I2, FIG. 12B illustrates second enlarged images, and FIG. 12C illustrates displayed images.

With reference to FIGS. 11A, 11B and 11C, assume that a cropping zone R1m corresponds to the combining timing area R01 (see FIG. 9). Cropping zones R11, R12, etc., become images that are the result of displaying first enlarged images I21, I22 obtained by cropping and enlargement, up to a first enlarged image of the frame preceding a first enlarged image I2m obtained by enlarging the cropping zone R1m. When the cropping zone R1m becomes the combining timing area R01, the first enlarged image I2m obtained by enlarging the image within the cropping zone R1m is combined with a second enlarged image I4m, which is obtained by enlarging the image within a cropping zone R3m corresponding to the cropping zone R1m, as illustrated in FIG. 12A. A combined image I5m becomes the displayed image. The combining ratio of the combined image I5m is as follows, by way of example: [first enlarged image I2m]:[second enlarged image I4m]=9:1.

This is followed by generating combined images successively in such a manner that the combining ratio of the first enlarged image falls and the combining ratio of the second enlarged image rises, with the combined images being displayed one after another in the manner shown in FIG. 11C. When the cropping zone R1n becomes an area slightly larger than the face-frame area R1, an image I5n (identical with image I61 in FIG. 12C), which prevails at the time of the transition when the first enlarged image I2n and second enlarged image I41 have been combined at a ratio of 1:1, is displayed.

Next, combined images I62 to I6m are generated successively in such a manner that the combining ratio of the second enlarged image rises and the combining ratio of the first enlarged image falls, with the combined images being displayed one after another in the manner shown in FIG. 12C. The cropping zone R3m prevailing when the combined image I6m is displayed corresponds to the combining timing area R02 (see FIG. 10), and the image displayed thereafter is the second enlarged image itself, not a combined image.

Figure 13:
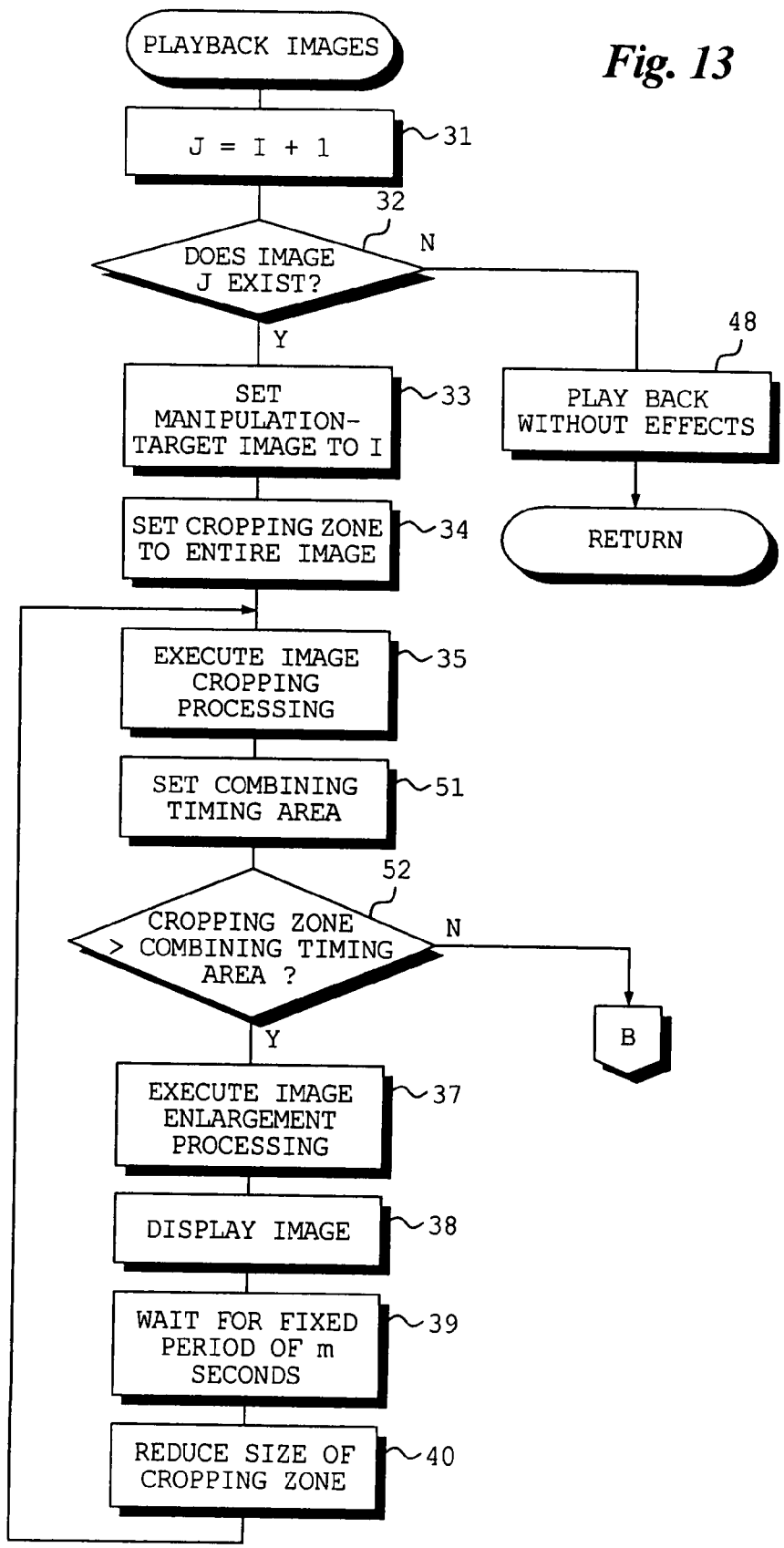
FIG. 13 is a flowchart illustrating image reproduction processing according to the second embodiment.
Figure 14:
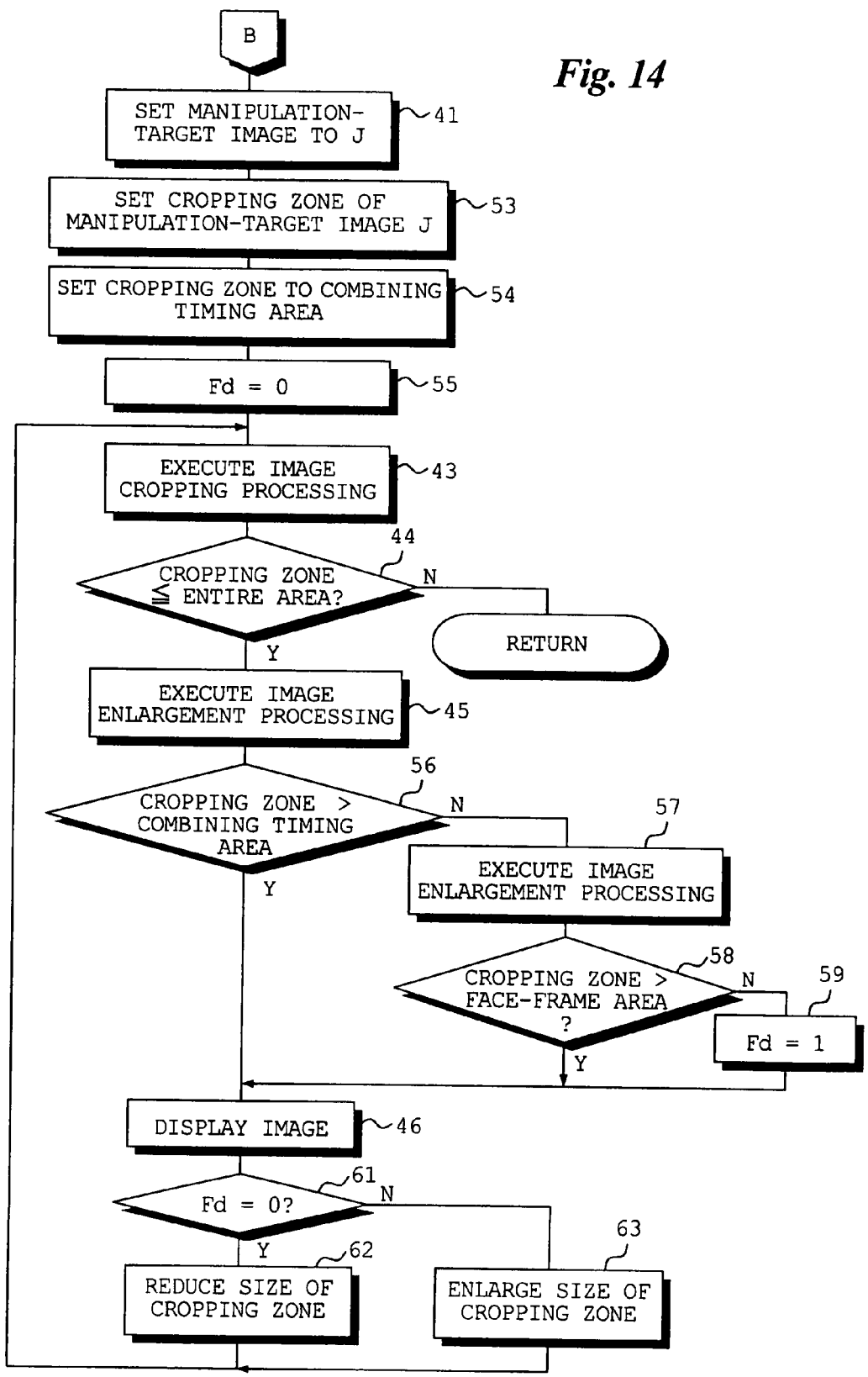
FIG. 14 is a flowchart illustrating image reproduction processing according to the second embodiment.

FIGS. 13 and 14 are flowcharts illustrating image reproduction processing and correspond to FIGS. 5 and 6. Processing steps in shown in FIGS. 13 and 14 identical with those shown in FIGS. 5 and 6 are designated by like step numbers and need not be described again.

The manipulation-target image is set to the first subject image I1 (step 33) and the combining timing area is set (step 51). If the cropping zone of the first subject image I1 exceeds the combining timing area ("YES" at step 52), then the first enlarged image per se is displayed in a manner similar to the first embodiment described above. If the cropping zone of the first subject image I1 is equal to or less than the combining timing area ("NO" at step 52), then the manipulation-target image is set to the second subject image I2 (step 41).

As described above with reference to FIGS. 9 and 10, the combining timing area (cropping zone) is set (step 51, step 53) in such a manner that the ratio of the height H11 of the face-frame area R1 of first subject image I1 to the height H12 of the combining timing area R01 and the ratio of the height H21 of the face frame R2 of second subject image I2 to the height H22 of the combining timing area R02 will be 1.5. The set cropping zone is set to the combining timing area R02 of the second subject image I2 (step 54). Since this is prior to the display changeover of the image obtained based upon the second subject image I2, a cropping-zone flag Fd is set to "0" so as to diminish the cropping zone of first subject image I1 (step 55).

If the cropping zone is equal to or smaller than the overall area ("YES" at step 44), image enlargement processing is executed because the image display continues, as described above (step 45). If the cropping zone is equal to or smaller than the combining timing area ("NO" at step 56), the first and second enlarged images are combined in such a manner that the combining ratio of the first enlarged image becomes higher than the combining ratio of the second enlarged image (step 57). Until the cropping zone takes on a size larger than the face-frame image, processing for combining the first and second enlarged images continues and the combined image is displayed while the cropping zone is reduced (steps 46, 61, 62). As a result, images are displayed in order from combined images I5m to I5n in such a manner that the combining ratio of the images of the first enlarged image and second enlarged image changes from 9:1 to 1:1, as illustrated in FIG. 11C.

When image I5n in FIG. 11C is displayed, the cropping zone R1n becomes equal to or smaller than face-frame area R1 ("NO" at step 58). When this occurs, it is necessary that the entirety of the second subject image I2 be displayed, as depicted in FIG. 12. To this end, the direction flag Fd is set to "1" in such a manner that the cropping zone is enlarged (step 59). While the cropping zone is being enlarged, combined images I61 to I6m in which the combining ratio of the second enlarged image gradually increases are displayed, as illustrated in FIG. 12C (steps 46, 61, 63).

When the combined image I6m is displayed and the cropping zone becomes larger than the combining timing area ("YES" at step 56), the image that is the combination of the first and second enlarged images is no longer displayed and the second enlarged images are displayed one after another in a manner similar to the first embodiment.

In the transition from the first subject image I1 to the second subject image I2, combined images are displayed in such a manner that the proportion of the first enlarged image obtained from the first subject image gradually decreases and the proportion of the second enlarged image obtained from the second subject image gradually increases. The viewer thus can view the manner in which images change over without the changeover appearing unnatural.

FIGS. 15 to 20 illustrate a further embodiment of the present invention. In this embodiment, the positions of eyes contained in a first enlarged image and the positions of eyes contained in a second enlarged image are made to coincide when the first enlarged image changes over to the second enlarged image.

Figure 15:
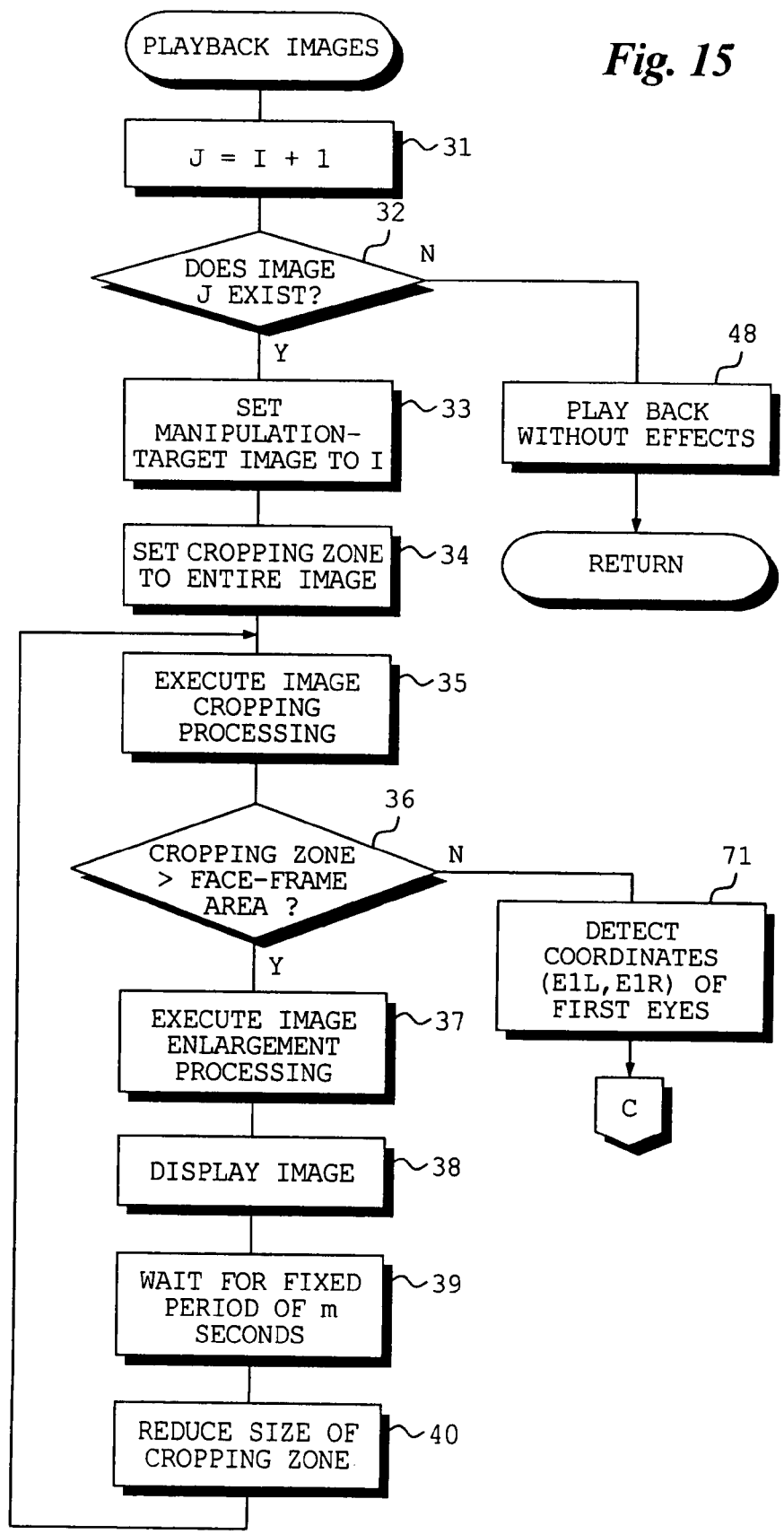
FIG. 15 is a flowchart illustrating image reproduction processing according to a third embodiment.
Figure 16:
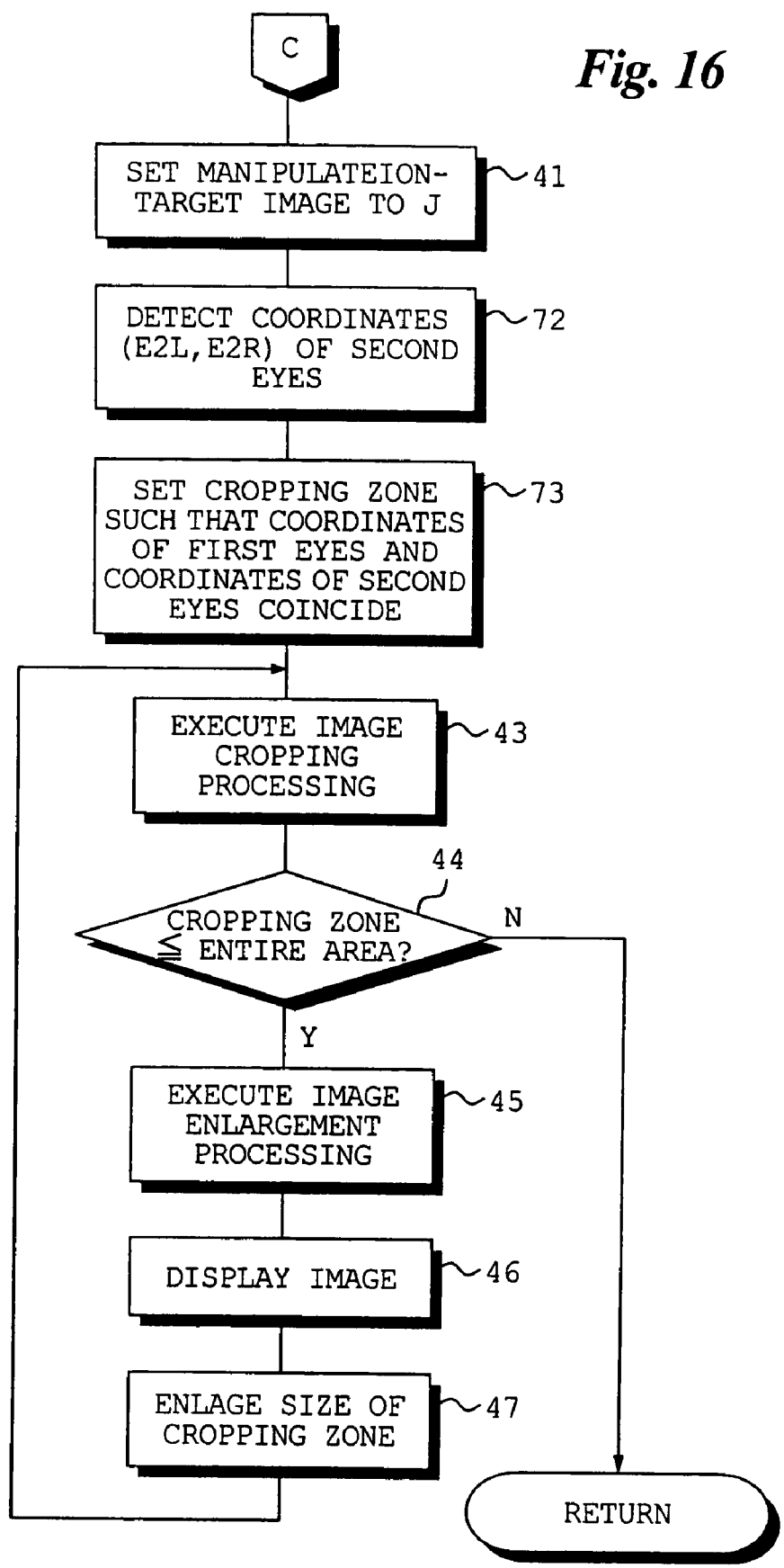
FIG. 16 is a flowchart illustrating image reproduction processing according to the third embodiment.
Figure 17:
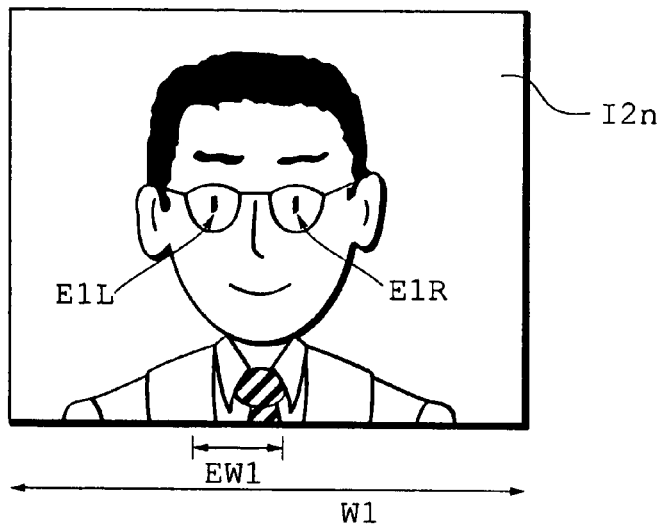
FIG. 17 illustrates an example of the image of a subject according to the third embodiment.
Figure 18A:
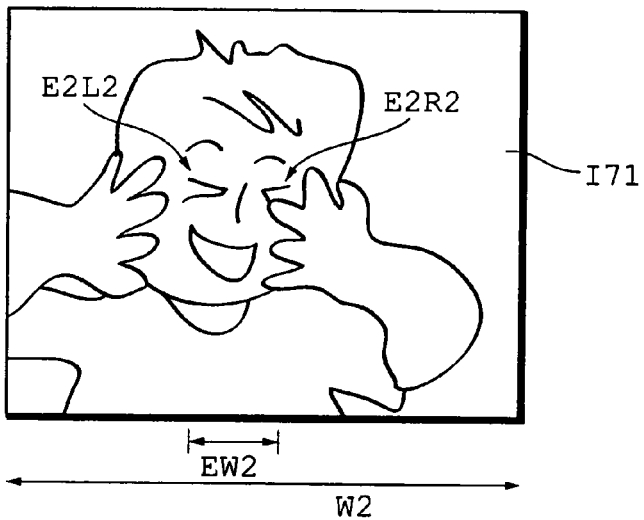
FIG. 18A illustrates an image that is part of the image of a subject.

FIGS. 15 and 16 are flowcharts illustrating image reproduction processing. Processing steps in shown in FIGS. 15 and 16 identical with those shown in FIGS. 5 and 6 are designated by like step numbers and need not be described again. FIG. 17 illustrates an example of the first enlarged image I2n, FIG. 18A illustrates an example of a second enlarged image I71, and FIG. 18B shows an example of a second subject image I7n.

When the first subject image I1 is set as the manipulation-target image (step 33) and the cropping zone is equal to or smaller than the face-frame area, coordinates E1L=(Lx1, Ly1), E1R=(Rx1, Ry1) of the eyes of the first enlarged image I2n at the time of transition are detected (see FIG. 17) (step 71).

Next, the second subject image I2 is set as the manipulation-target image (step 41) and coordinates E2L1=(Lx21, Ly21), E2R1=(Rx21, Ry21) of the eyes of the second subject image I2 are detected (see FIG. 18B) (step 72). A cropping zone R8n of the second subject image is set (step 73) with reference being made to the coordinates E2L1, E2R1 of the second subject image I2 in such a manner that the detected eye coordinates E11, E1R and coordinates E2L2=(Lx22, Ly22), E2R2=(Rx22, Ry22) of eyes in the second enlarged image I71 at the time of the changeover will coincide (see FIG. 18A). The setting of the cropping zone is performed in the manner set forth below.

Figure 18B:
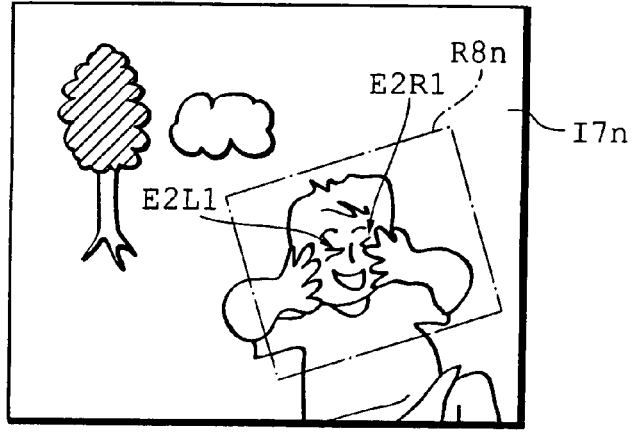
FIG. 18B illustrates the entire image of the subject according to the third embodiment.

An image is cropped from the second subject image I7n in such a manner that the height of the first enlarged image I2n (see FIG. 17) and the height of the second enlarged image I71 (see FIG. 18A) will coincide, and the cropping zone R8n of the second subject image I7n is decided in such a manner that the ratio of the width of the first enlarged image I2n to the width between the eyes of the first enlarged image I2n and the ratio of the width of the second enlarged image I71 to the width between the eyes of the second enlarged image I71 will coincide (see FIG. 18B). That is, if we let W1 represent the width of the first enlarged image I2n, EW1 the width between the eyes of the first enlarged image I2n, W2 the width of the second enlarged image I71 and EW2 the width between the eyes of the second enlarged image I71, the cropping zone R8n is set in such a manner that EW2/W2=EW1/W1 will hold.

The second enlarged images are subsequently displayed while the cropping zone gradually increases in size, in the same manner as in the embodiments described above. It goes without saying that in a case where the cropping zone of the second subject image and the second subject image are not parallel, the second enlarged image displayed is subjected to rotation processing.

Figure 7:
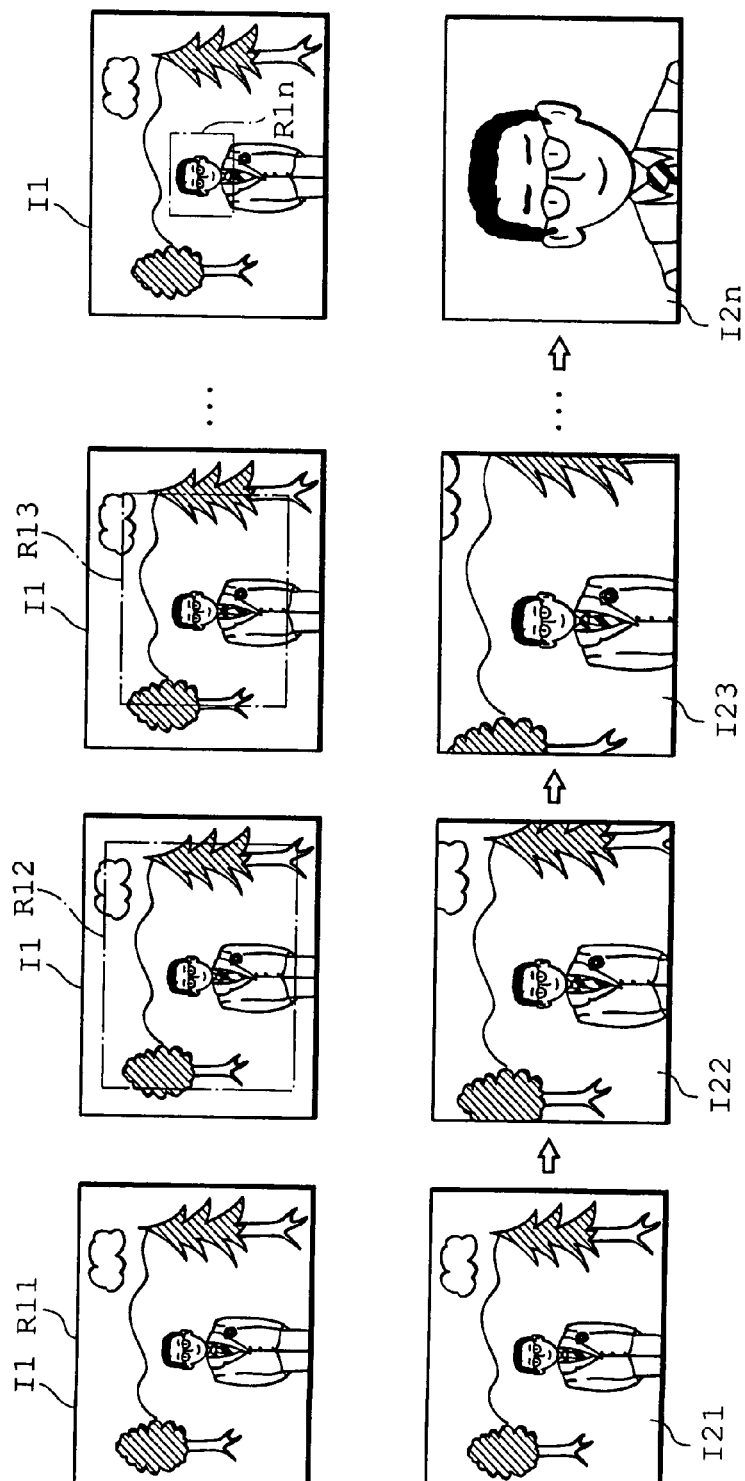
FIG. 7A illustrates cropping zones of a first subject image.
FIG. 7B illustrates first enlarged images according to the first embodiment.
Figure 8:
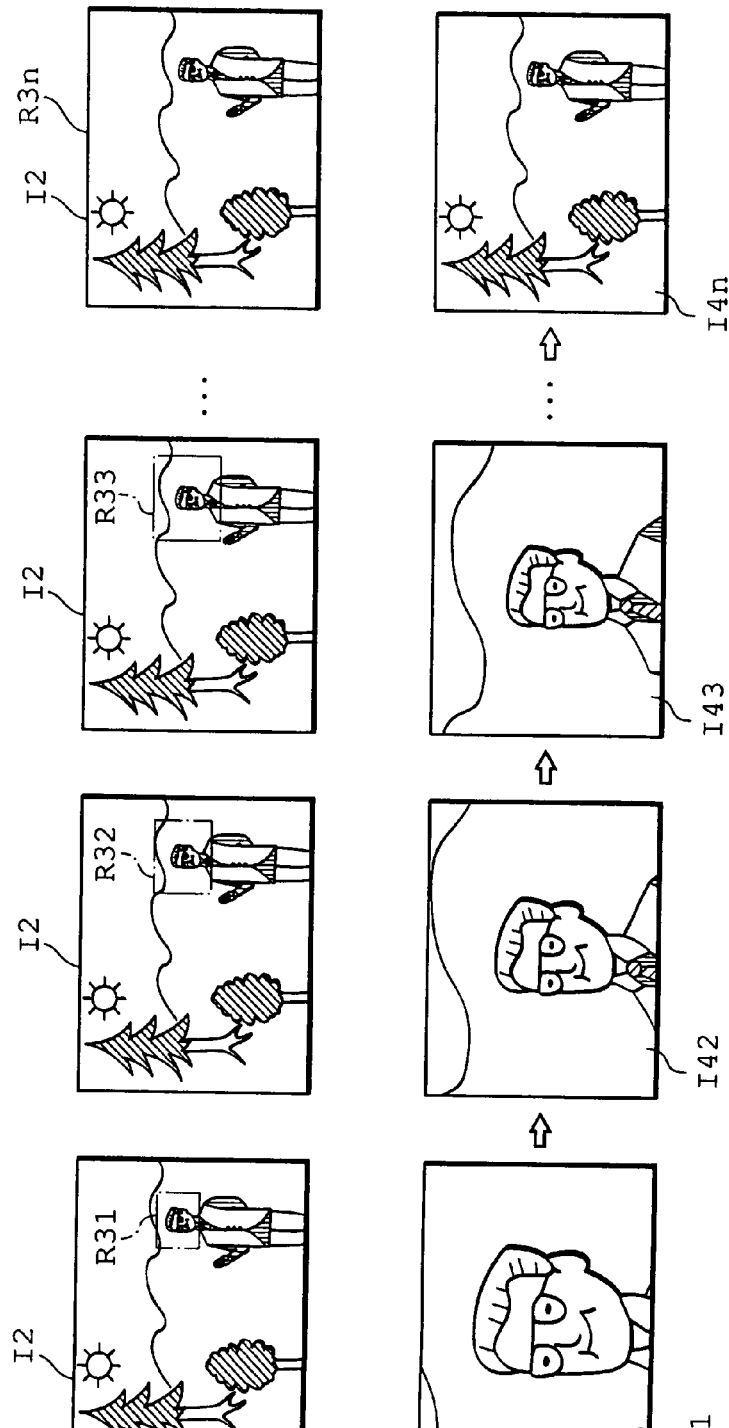
FIG. 8A illustrates cropping zones of a second subject image.
FIG. 8B illustrates second enlarged images according to the first embodiment.

In the embodiment described above, the invention is applied to a case where the display undergoes a transition from the first subject image to the second subject image, without combining first and second enlarged images, as illustrated in FIGS. 7 and 8. However, the invention can also be applied to an arrangement in which the display undergoes a transition from the first subject image to the second subject image while first and second enlarged images are combined in the manner illustrated in FIGS. 11 and 12.

Figure 19:
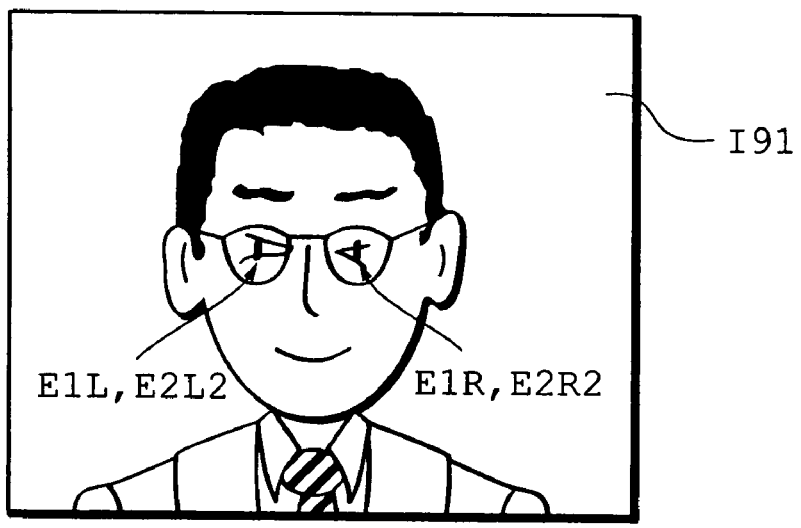
FIG. 19 illustrates an example of a combined image according to the third embodiment.

FIG. 19 illustrates an example of a combined image I91 in a case where the display undergoes a transition from the first subject image to the second subject image while first and second enlarged images are combined. Since the positions (E1L, E1R) of the eyes contained in the first enlarged image and the positions (E2L2, E2R2) of the eyes contained in the second enlarged image coincide in the combined image I91, the number of eyes is two and the image does not appear unnatural.

Figure 20:
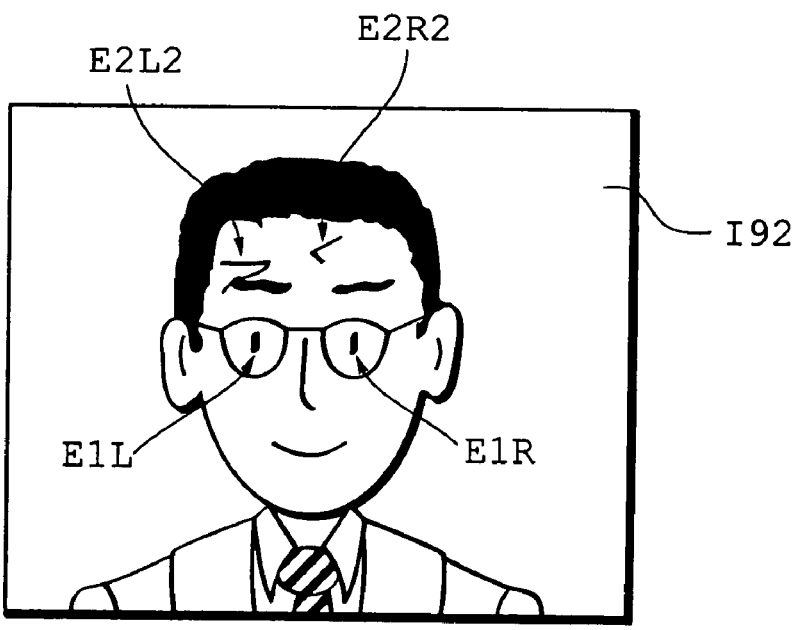
FIG. 20 illustrates an example of a combined image according to the third embodiment.

FIG. 20 illustrates an example of a combined image I92 obtained by combining first and second enlarged images in a case where processing for bringing the eyes into agreement is not executed. Since the positions (E1L, E1R) of the eyes contained in the first enlarged image and the positions (E2L2, E2R2) of the eyes contained in the second enlarged image do not coincide, the number of eyes is four and the image has an unnatural appearance. In order to facilitate an understanding of this point, only the eyes of the second enlarged image and not the second enlarged image per se are illustrated in FIGS. 19 and 20.

Figure 21:
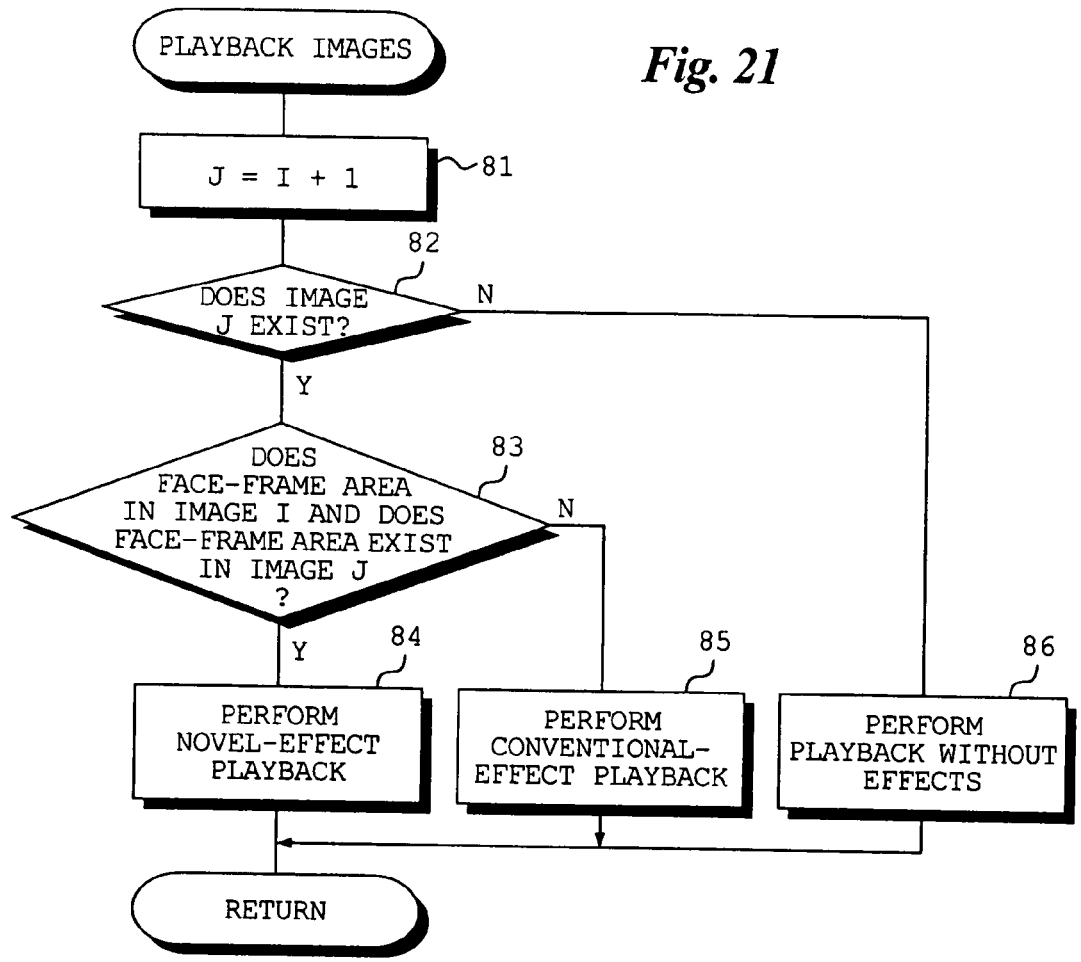
FIG. 21 is a flowchart illustrating image reproduction processing according to a fourth embodiment.

FIG. 21 is a flowchart illustrating image reproduction processing according to a further embodiment of the invention.

Here the above-described processing (processing for novel effects) is executed in a case where face-image portions are contained in both a first subject image indicated by variable I and a second subject image indicated by variable J, and face-frame areas are defined.

The variable J is set to a value obtained by incrementing the variable I (step 81), and whether an image specified by the variable J exists is determined (step 82). If this image does not exist ("NO" at step 82), then playback without effects is performed in a manner similar to that described above (step 86).

If an image specified by the variable J does exist ("YES" at step 82), then whether face-frame areas exist in both of the two successive frames of subject images specified by the variable I and J is determined (step 83). If face-frame areas exist in both images ("YES" at step 83), then novel-effect playback is performed (step 84). If a face-frame area does not exist in either of the images ("NO" at step 83), then playback with conventional effects such as fade-in/fade-out or wipe is performed (step 85).

FIGS. 22 to 25 illustrate yet another embodiment of the present invention. This embodiment relates to processing for a case where a subject image contains a plurality of face images.

Figure 22:
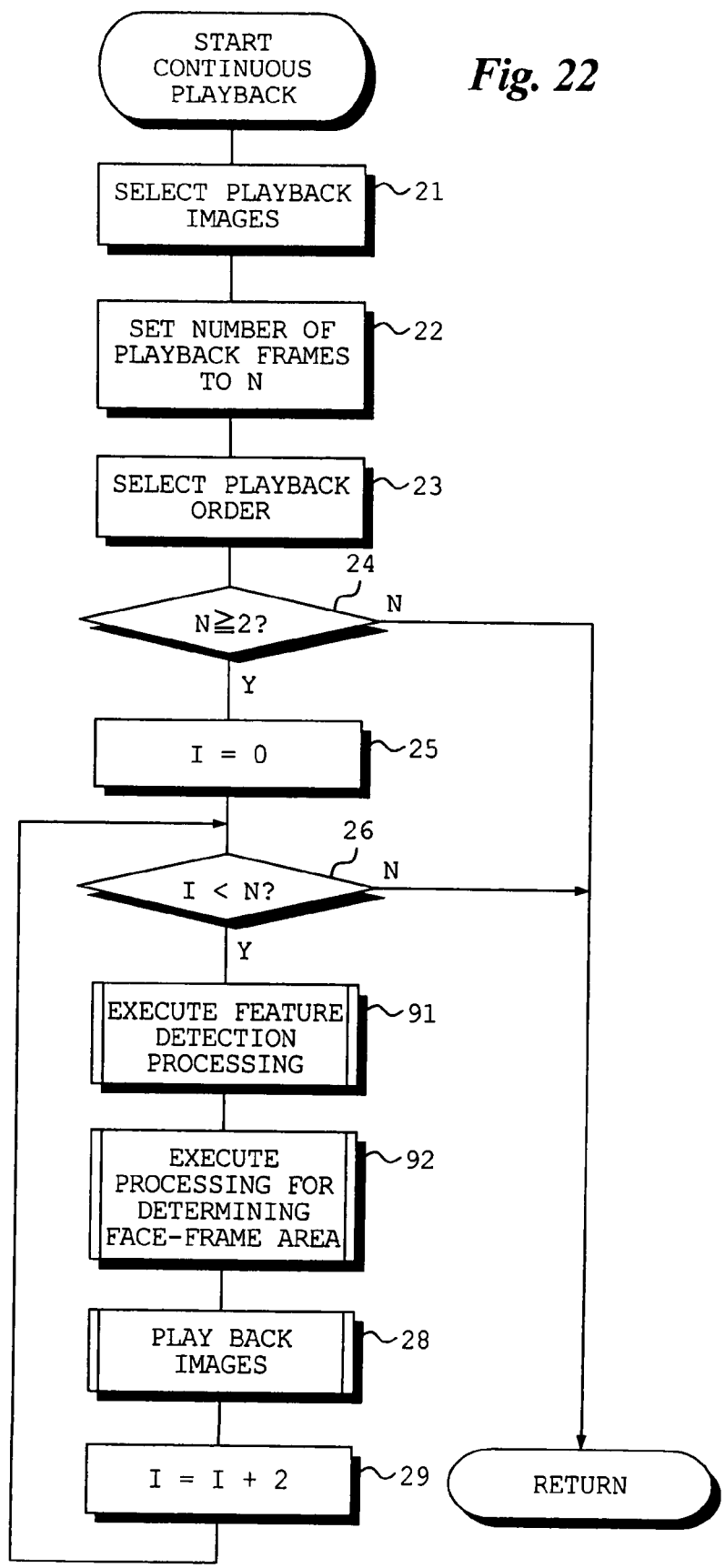
FIG. 22 is a flowchart illustrating processing executed by a feature detecting unit according to a fifth embodiment.

FIG. 22 is a flowchart illustrating processing executed by an image reproducing apparatus. FIG. 22 corresponds to the processing shown in FIG. 4, and processing steps in shown in FIG. 22 identical with those shown in FIG. 4 are designated by like step numbers and need not be described again.

The feature of a face image contained in a subject image is detected (step 91). Processing for determining a face-frame area in a case where a plurality of face images are contained in the subject image is executed utilizing the detected feature (step 92). This is followed by executing processing for reproducing subject images of a plurality of frames in the manner described above.

Figure 23:
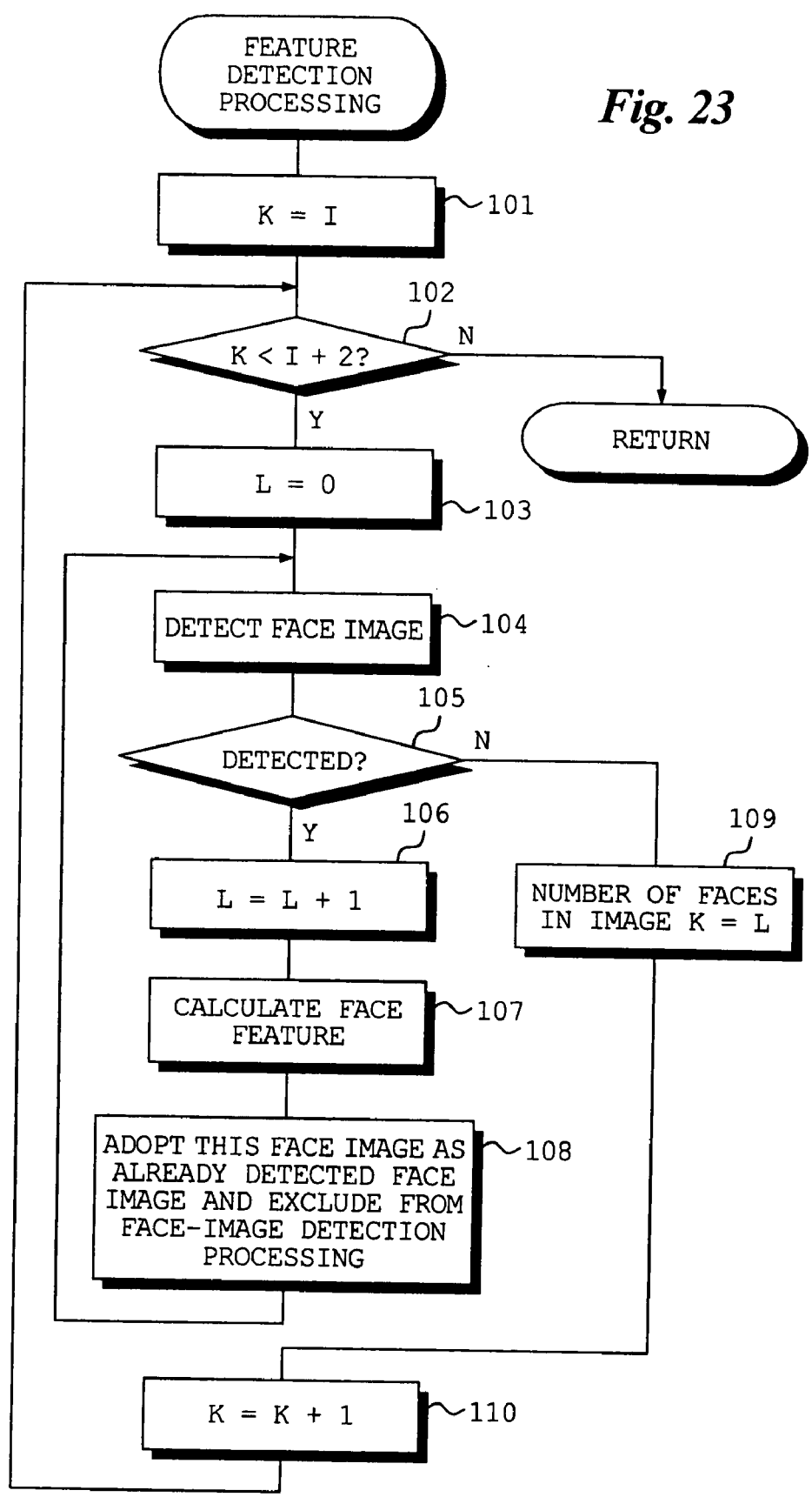
FIG. 23 is a flowchart illustrating image reproduction processing according to the fifth embodiment.

FIG. 23 is a flowchart illustrating processing for detecting a feature (the processing of step 91 in FIG. 22).

Since processing is executed in units of two frames of subject images, namely first and second subject images, feature detection processing also is executed in units of two frames of subject images. Accordingly, a variable K is introduced and the variable K is set to the variable I, which represents the first subject image, as described above (step 101). Processing is exited when the variable K takes on a value equal to or greater than variable I+2 (step 102).

If the variable K is less than variable I+2 ("YES" at step 102), then a face-image variable L regarding the number of face images contained in the subject image is introduced and the face-image variable L is set to 0 (step 103). The first subject image is subjected to face-image detection processing (step 104).

If face images are detected from the first subject image ("YES" at step 105), then the face-image variable L is incremented (step 106) and the feature of a face regarding any face image among the detected face images is calculated (step 107). The feature of the face is the result of putting the face image into numerical form and is obtained by a well-known method using the sizes and positions, etc., of the parts of a face, such as the eyes, nose and mouth. Face-image detection processing is executed again while excluding the face image for which the feature has been calculated from this face-image detection processing (steps 108, 104).

If processing for calculating the features of faces ends with regard to all face images contained in the first subject image ("NO" at step 105), then the number of faces in the first subject image is adopted as the value of the face-image variable L (step 109). The variable K is incremented (step 110) and the features of all face images contained in the second subject image are calculated in a manner similar to that of the first face image.

Figure 24:
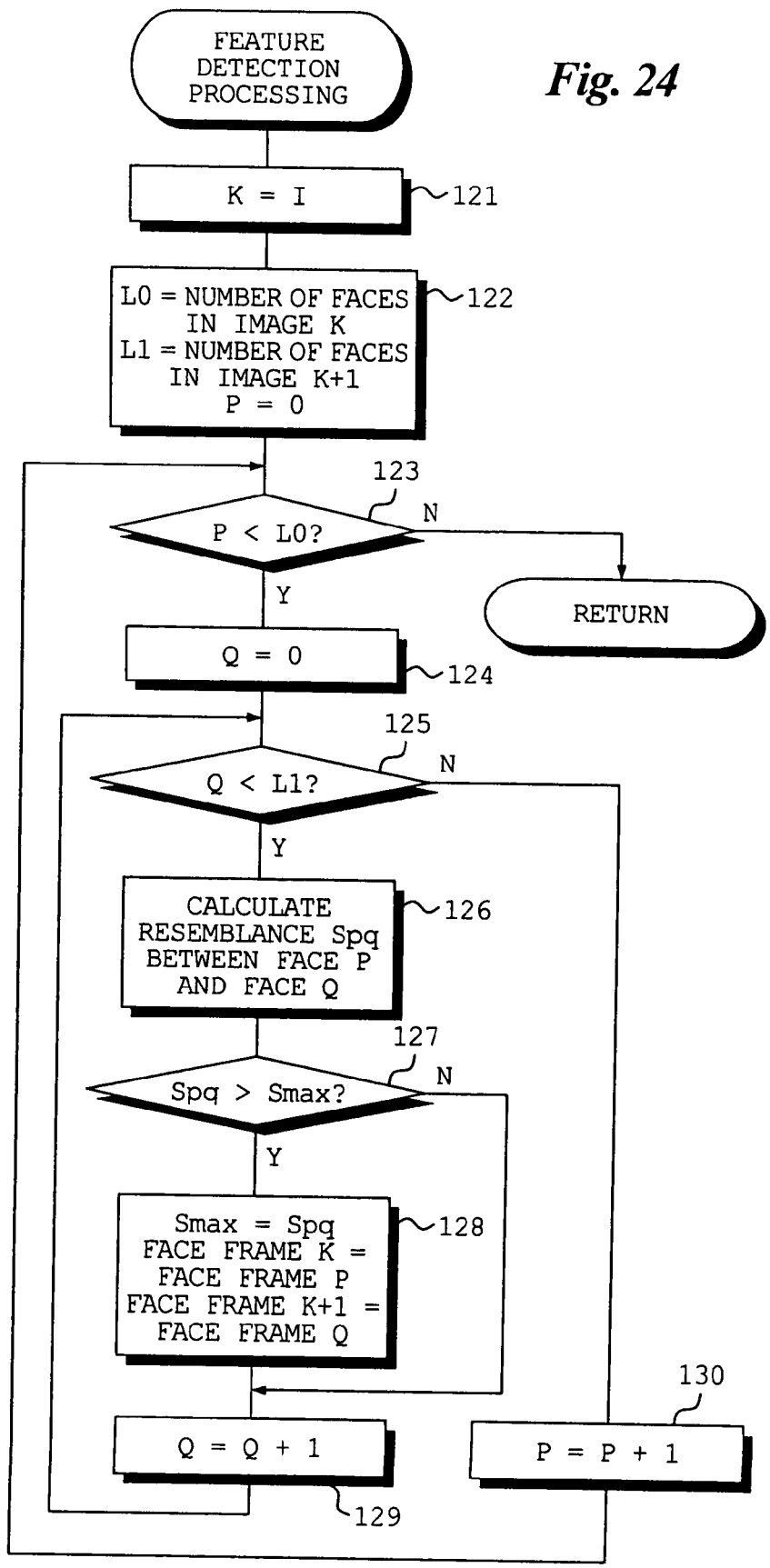
FIG. 24 is a flowchart illustrating processing for determining a face-frame area according to the fifth embodiment.

FIG. 24 is a flowchart illustrating processing for determining a face-frame area (the processing of step 92 in FIG. 22). Processing is executed in such a manner that a face image contained in a first enlarged image and a face image contained in a second enlarged image that are displayed when a transition is made from the first subject image to the second subject image will resemble each other.

The variable I is set to the variable K in order to execute processing for determining the face-frame area of the first subject image (step 121). The number of faces in subject image K (first subject image) is set to L0, and the number of faces in subject image K+1 (second subject image) is set to L1. A variable P for deciding a face frame using all face images contained in subject image K is introduced and is set to 0 (step 122). Processing for determining the face-frame area continues until the value of variable P becomes equal to or greater than the number L0 of faces (step 123). If the value of variable P is less than the number L0 of faces ("YES" at step 123), then a variable Q for deciding a face frame using all face images contained in subject image K+1 is introduced and is set to 0 (step 124). Processing for determining the face-frame area continues until the value of variable Q becomes equal to or greater than the number L1 of faces (step 125). The processing described below is executed if the value of variable Q is less than the number L1 of faces ("YES" at step 125).

Among the degrees of resemblance of the face images between the set of all face images contained in the subject image K (first subject image) and the set of all face images contained in the subject image K+1 (second subject image), the frames enclosing the closest resembling face images are determined to be the face frames of the subject image K and subject image K+1. More specifically, the determination is made as follows: First, degree Spq of resemblance is calculated between one face image contained in the subject image K (first subject image) specified by variable P and one face image contained in the subject image K+1 (second subject image) specified by variable Q (step 126). The calculated degree Spq of resemblance is compared with a provisional maximum degree Smax of resemblance (the initial value of which is 0). If the calculated degree Spq of resemblance is greater than the provisional maximum degree Smax of resemblance ("YES" at step 127), then the provisional maximum degree Smax of resemblance is updated in such a manner that the degree Spq of resemblance at this time becomes the provisional maximum degree Smax of resemblance. Further, the frame enclosing the face image specified by variable P of subject image K used when this degree Spq of resemblance was calculated is adopted as the provisional face frame of subject image K, and the frame enclosing the face image specified by variable Q of subject image K+1 is adopted as the provisional face frame of subject image K+1 (step 128). If the calculated degree Spq of resemblance is equal to or less than the provisional maximum degree Smax of resemblance ("NO" at step 127), the processing of step 128 is skipped.

The variable Q is incremented (step 129) and the degree Spq of resemblance is calculated between one face image contained in the subject image K specified by variable K and another face image contained in the subject image K+1 specified by variable Q. The provisional maximum degree Smax of resemblance and the provisional face frame are updated.

If the processing of steps 124 to 129 regarding one face image contained in the subject image K ends ("NO" at step 125), then the variable P regarding subject image K is incremented (step 130) and processing for calculating degree of resemblance between a face image contained in the subject image K+1 and another face image contained in the subject image K is executed.

The finally updated provisional maximum degree Smax of resemblance becomes the maximum degree Smax of resemblance, and the face frames are determined to be the respective frames of the face image contained in subject image K and the face image contained in subject image K+1 constituting the combination of face images that give the maximum degree Smax of resemblance.

Figure 25:
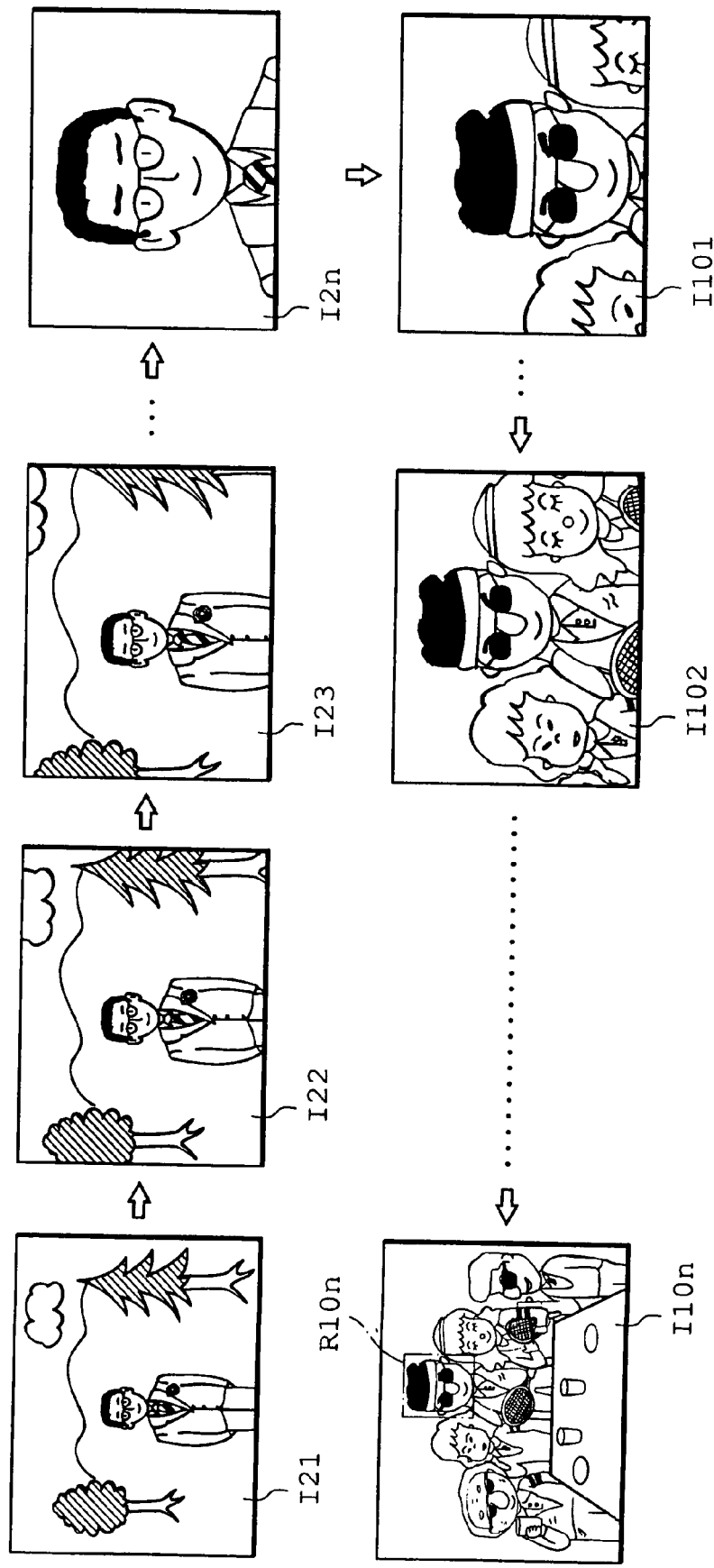
FIG. 25 illustrates the manner in which the image of a subject undergoes a transition according to the fifth embodiment.

FIG. 25 illustrates the manner in which a face image contained in a face frame determined as set forth above is utilized as a transitional image.

A first subject image contains one face image, and a second subject image contains a plurality of face images. Assume that among the plurality of face images contained in the second subject image, a face image that most resembles the face image contained in the first subject image is the face image enclosed by a face frame R10n.

First of all, first enlarged images I21 to I2n obtained from the first subject image are displayed. When the first enlarged image I2n prevailing at the time of the transition is displayed, an image obtained by enlarging a face image enclosed by a face frame R10n is displayed as a second enlarged image I101 prevailing at the time of the transition. The second enlarged images are subsequently displayed in the manner of images obtained by gradually zooming out from the face image enclosed by the face frame R10n in the manner described above. The second subject image is eventually displayed. Since the faces displayed before and after the transition resemble each other, the transition does not appear unnatural to the viewer.

Figure 26:
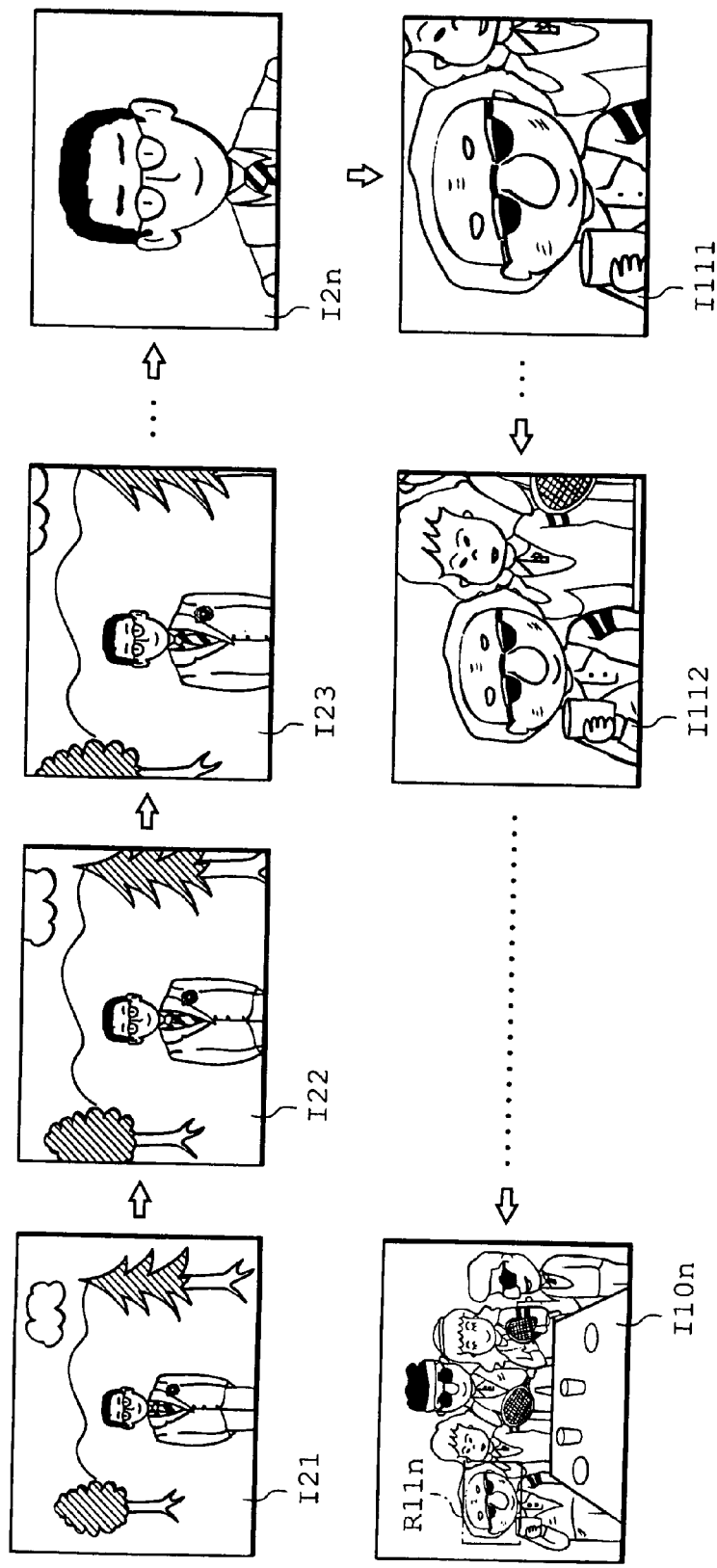
FIG. 26 illustrates the manner in which the image of a subject undergoes a transition according to a modification.

FIG. 26 illustrates the manner in which a subject image changes over according to a modification. In the foregoing embodiment, resembling face images displayed before and after a transition are selected. In this modification, however, the face image having the largest size among a plurality of face images contained in the second subject image is displayed at the time of the transition.

The first subject image I2 contains one face image and the second subject image contains a plurality of face images. First enlarged images obtained from the first subject image I2 are displayed one after another in the manner described above. On the assumption that the face image enclosed by face frame R11n is the largest among the plurality of face images contained in the second subject image, a second enlarged image I111 in which the face image enclosed by the face frame R11n is displayed in close-up becomes the image presented at the time of the transition. The second enlarged images are subsequently displayed in the manner of images obtained by gradually zooming out from the face image enclosed by the face frame R11n in the manner described above. The second subject image is eventually displayed.

As many apparently widely different embodiments of the present invention can be made without departing from the spirit and scope thereof, it is to be understood that the invention is not limited to the specific embodiments thereof except as defined in the appended claims.

What is claimed is:

1. An image reproducing apparatus comprising:
  a first cropping device, as executed by a processor of a computer, for cropping an image from a first subject image in such a manner that a face-image portion contained in the first subject image will be included in a portion of the image that has been cropped;
  a first enlarging device for enlarging the image, which has been cropped by said first cropping device, so as to take on a size of the first subject image;
  a first display control device for controlling a display unit in such a manner that the cropped image enlarged by said first enlarging device is displayed on a display screen;
  a first control device for controlling said first cropping device, said first enlarging device and said first display control device so as to repeat the cropping the image, the enlarging the image, and the controlling the display unit in such a manner that the cropped image will become smaller than a preceding cropped image, until the cropped image takes on a prescribed size;
  a second cropping device for cropping an image from a second subject image in such a manner that a face-image portion contained in the second subject image will be included in a portion of the image that has been cropped, said cropping the image from the second subject image being performed in response to the image cropped by said first cropping device taking on the prescribed size;
  a second enlarging device for enlarging the image, which has been cropped by said second cropping device, so as to take on a size of the second subject image;
  a second display control device for controlling the display unit in such a manner that the cropped image enlarged by said second enlarging device is displayed on the display screen; and
  a second control device for controlling said second cropping device, said second enlarging device and said second display control device so as to repeat the cropping the image from the second subject image, the enlarging the image of the second enlarging device and the controlling the display unit of the second control device in such a manner that the cropped image will become larger than the preceding cropped image,
  wherein said first display control device and said second display control device control the display unit in such a manner that a first enlarged image enlarged by said first enlarging device and a second enlarged image enlarged by said second enlarging device are combined and displayed on the display screen,
  wherein said first display control device combines and displays the first and second enlarged images in such a manner that as a size of the cropped image cropped by said first cropping device decreases, a proportion of the first enlarged image combined decreases and a proportion of the second enlarged image combined increases, and
  wherein said second display control device combines and displays the first and second enlarged images in such a manner that as a size of the cropped image cropped by said second cropping device increases, the proportion of the first enlarged image combined decreases and the proportion of the second enlarged image combined increases.

2. The apparatus according to claim 1, wherein said second cropping device executes said cropping the image from the second subject image so as to achieve coincidence between relative positions of eyes in the cropped image cropped by said first cropping device and relative positions of eyes in a first cropped image cropped by said second cropping device, and decides a cropped image in such a manner that a positional relationship between the cropped image and the second subject image will gradually match.

3. The apparatus according to claim 1, further comprising a halt control device for halting processing by the image reproducing apparatus if the first subject image or the second subject image does not contain a face-image portion.

4. The apparatus according to claim 1, wherein in a case where at least one of the first subject image and second subject image contains a plurality of face images, said first cropping device and said second cropping device execute processing for cropping an image from the first subject image and processing for cropping an image from the second subject image in such a manner that the images will contain face-image portions for which a degree of resemblance of the cropped images will be high.

5. The apparatus according to claim 1, wherein a fluctuation of an image size and a fluctuation of an image combining proportion are performed at a same time.

6. The apparatus according to claim 1, wherein combining of the first and second enlarged images begins in response to a cropping zone of the first subject image becoming equal to or smaller than a combining timing area, and
  wherein the combining of the first and second enlarged images terminates in response to a cropping zone of the second subject image becoming larger than the combining timing area.

7. The apparatus according to claim 1, wherein combining of the first and second enlarged images comprises replacement of images by overlapping the images.

8. A method of controlling an image reproducing device, said method comprising:
  cropping a first image from a first subject image in such a manner that a face-image portion contained in the first subject image will be included in a portion of the first image that has been cropped;
  enlarging the cropped first image so as to take on a size of the first subject image;
  displaying the enlarged cropped first image on a display screen;
  repeating the cropping the first image, the enlarging the cropped first image, and the displaying the enlarged cropped first image in such a manner that the cropped first image will become smaller than a preceding cropped first image, until the cropped first image takes on a prescribed size;
  cropping a second image from a second subject image in such a manner that a face-image portion contained in the second subject image will be included in a portion of the second image that has been cropped, the cropping the second image being performed in response to the first image after cropping taking on the prescribed size;
  enlarging the cropped second image so as to take on a size of the second subject image;

displaying the enlarged cropped second image on the display screen;

repeating the cropping the second image, the enlarging the cropped second image, and the displaying the enlarged cropped second image in such a manner that the cropped second image will become larger than a preceding cropped second image;

combining and displaying on the display screen a first enlarged image enlarged by said enlarging the cropped first image and a second enlarged image enlarged by said enlarging the cropped second image, combining and displaying the first and second enlarged images in such a manner that as a size of the cropped first image decreases, a proportion of the first enlarged image combined decreases and a proportion of the second enlarged image combined increases, and combining and displaying the first and second enlarged images in such a manner that as a size of the cropped second image increases, the proportion of the first enlarged image combined decreases and the proportion of the second enlarged image combined increases.

9. The method according to claim 8, wherein a fluctuation of an image size and a fluctuation of an image combining proportion are performed at a same time.

10. The method according to claim 8, wherein combining of the first and second enlarged images begins in response to a cropping zone of the first subject image becoming equal to or smaller than a combining timing area, and wherein the combining of the first and second enlarged images terminates in response to a cropping zone of the second subject image becoming larger than the combining timing area.

11. The method according to claim 8, wherein combining of the first and second enlarged images comprises replacement of images by overlapping the images.

12. A non-transitory computer-readable recording medium encoded with a computer program for controlling an image reproducing apparatus so as to:

execute first cropping processing for cropping an image from a first subject image in such a manner that a face-image portion contained in the first subject image will be included in a portion of the image that has been cropped;

execute first enlarging processing for enlarging the image, which has been cropped by said first cropping processing, so as to take on a size of the first subject image;

execute first display control processing for controlling a display unit in such a manner that the cropped image enlarged by said first enlarging processing is displayed on a display screen;

repeat said first cropping processing, said first enlarging processing, and said first display control processing in such a manner that the cropped image will become smaller than a preceding cropped image, until the cropped image takes on a prescribed size;

execute second cropping processing for cropping an image from a second subject image in such a manner that a face-image portion contained in the second subject image will be included in a portion of the image that has been cropped, the cropping the image from the second subject image being performed in response to the image cropped by said first cropping processing taking on the prescribed size;

execute second enlarging processing for enlarging the image, which has been cropped by said second cropping processing, so as to take on a size of the second subject image;

execute second display control processing for controlling the display unit in such a manner that the cropped image enlarged by said second enlarging processing is displayed on the display screen; and repeat said second cropping processing, said second enlarging processing, and said second display control processing in such a manner that the cropped image will become larger than a preceding cropped image, wherein the first display control processing and the second display control processing control the display unit in such a manner that a first enlarged image enlarged by said first enlarging processing and a second enlarged image enlarged by said second enlarging processing are combined and displayed on the display screen, wherein said first display control processing combines and displays the first and second enlarged images in such a manner that as a size of the cropped image cropped by said first cropping processing decreases, a proportion of the first enlarged image combined decreases and a proportion of the second enlarged image combined increases, and wherein said second display control processing combines and displays the first and second enlarged images in such a manner that as a size of the cropped image cropped by said second cropping processing increases, the proportion of the first enlarged image combined decreases and the proportion of the second enlarged image combined increases.

13. The recording medium on which the computer program set forth in claim 12 has been recorded.

14. The non-transitory computer-readable storage medium according to claim 12, wherein a fluctuation of an image size and a fluctuation of an image combining proportion are performed at a same time.

15. The non-transitory computer-readable storage medium according to claim 12, wherein combining of the first and second enlarged images begins in response to a cropping zone of the first subject image becoming equal to or smaller than a combining timing area, and wherein the combining of the first and second enlarged images terminates in response to a cropping zone of the second subject image becoming larger than the combining timing area.

16. The non-transitory computer-readable storage medium according to claim 12, wherein combining of the first and second enlarged images comprises replacement of images by overlapping the images.

* * * * *